United States Patent
Wang et al.

(10) Patent No.: US 11,057,572 B1
(45) Date of Patent: Jul. 6, 2021

(54) APPARATUS AND METHODS FOR IMAGE CAPTURE CONTROL

(71) Applicant: QUALCOMM Incorporated, San Diego, CA (US)

(72) Inventors: Hailong Wang, San Diego, CA (US); Lee-Kang Liu, San Diego, CA (US); Shizhong Liu, San Diego, CA (US); Weiliang Liu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/830,933

(22) Filed: Mar. 26, 2020

(51) Int. Cl.
*H04N 5/262* (2006.01)
*H04N 5/232* (2006.01)
*H04N 5/225* (2006.01)

(52) U.S. Cl.
CPC ......... *H04N 5/2628* (2013.01); *H04N 5/2259* (2013.01); *H04N 5/23245* (2013.01); *H04N 5/23296* (2013.01)

(58) Field of Classification Search
CPC ............. H04N 5/2628; H04N 5/23296; H04N 5/2259; H04N 5/23245; H04N 5/2258
See application file for complete search history.

(56) References Cited

U.S. PATENT DOCUMENTS

| | | | | |
|---|---|---|---|---|
| 6,654,506 B1* | 11/2003 | Luo | ...................... | G06K 9/3233 345/620 |
| 6,876,386 B1* | 4/2005 | Ito | ...................... | H04N 5/23293 348/240.1 |
| 7,227,573 B2* | 6/2007 | Stavely | ................ | H04N 5/2628 348/222.1 |
| 7,417,670 B1* | 8/2008 | Linzer | ................ | H04N 9/04515 348/222.1 |
| 2004/0189830 A1* | 9/2004 | Pollard | ................ | H04N 5/2628 348/240.1 |
| 2005/0046710 A1* | 3/2005 | Miyazaki | ............. | H04N 5/7755 348/239 |
| 2011/0267495 A1* | 11/2011 | Atkinson | ............... | H04N 5/378 348/229.1 |
| 2021/0075969 A1* | 3/2021 | Liu | ........................ | H04N 5/345 |

* cited by examiner

*Primary Examiner* — Hung H Lam
(74) *Attorney, Agent, or Firm* — Qualcomm Incorporated

(57) ABSTRACT

Methods, systems, and apparatuses are provided that adapt image capture operations to provide refined image capture capabilities. For example, an image capture device captures image data from a sensor operating at a first binning level. The image capture device receives a desired level of zoom, and determines whether the sensor is to be transitioned from the first binning level to a second binning level based on a binning transition threshold. If the sensor is to be transitioned, the image capture device adjusts one or more image capture operations, such as auto focus, automatic exposure, automatic gain, or automatic white balance, based on the desired level of zoom. After an amount of time, the image capture device transitions the sensor from the first binning level to the second binning level. The image capture device then captures image data from the sensor operating at the second binning level.

30 Claims, 10 Drawing Sheets

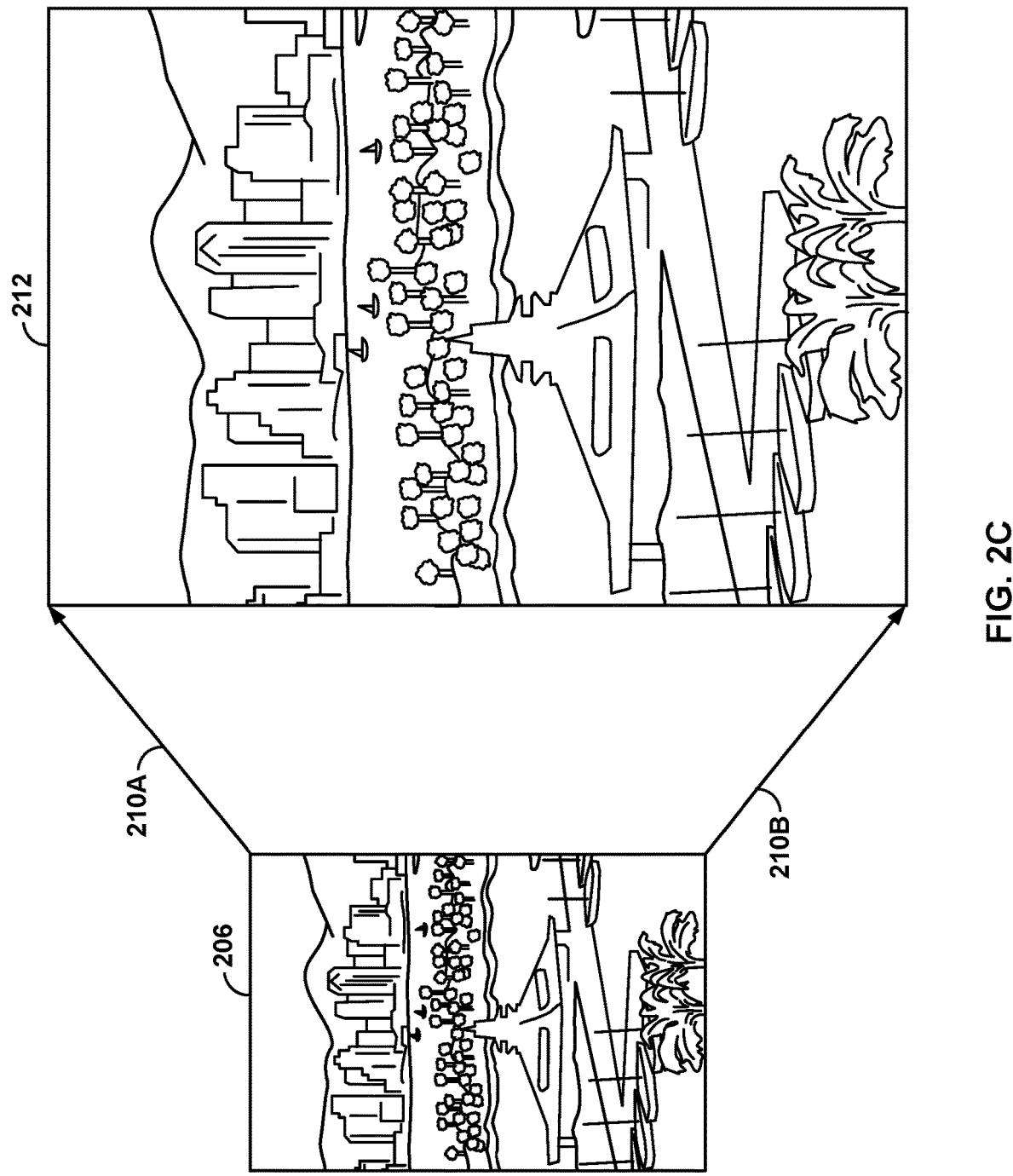

APPARATUS AND METHODS FOR IMAGE CAPTURE CONTROL

BACKGROUND

Field of the Disclosure

This disclosure generally relates to optical systems and processes and, more specifically, to image capture and processing apparatus and methods.

Description of Related Art

Many image capture devices, such as cameras, capture specified portions of a potential field-of-view (FOV), such as with a zoom-in functionality, or with a zoom-out functionality, and enhance, or otherwise alter, a captured image of a scene (or sequence of images, in the case of video). For example, an image capture device may perform pixel binning by combining multiple pixels of an image sensor into fewer pixels and further, may adjust a binning level of the performed pixel binning in accordance with changes in a zoom level. In other examples, an image capture device may include image sensors and may capture an image from a first one of the image sensors. Responsive to a change in a corresponding zoom level, the image capture device may capture a subsequent image with a second one of the image sensors, and due to the change in the corresponding zoom level, the image capture device may perform binning for each of the first sensor and second sensors at differing binning levels. The differences in binning levels may, in some instances, cause errors or defects to appear in the images captured by the first and second image sensors.

SUMMARY

According to one aspect, a method for operating an image capture device comprises receiving first image data captured by a first image sensor in accordance with a first binning level. The method includes applying an image capture operation to the first image data using a setting that is based on the first binning level. The method further includes receiving input data comprising a first zoom level, and determining a second binning level for the first image sensor based on the first zoom level. The method also includes adjusting the setting of the first image capture operation based on the second binning level. The method further includes receiving second image data captured by the first image sensor in accordance with the first binning level. The method includes applying the image capture operation to the second image data using the adjusted setting. Further, the method includes adjusting the first binning level to the second binning level subsequent to the capturing of the second image data.

According to another aspect, an image capture device comprises a non-transitory, machine-readable storage medium storing instructions, and at least one processor coupled to the non-transitory, machine-readable storage medium. The at least one processor is configured to execute the instructions to receive first image data captured by a first image sensor in accordance with a first binning level. The processor is also configured to apply an image capture operation to the first image data using a setting that is based on the first binning level. The processor is further configured to receive input data comprising a first zoom level, and determine a second binning level for the first image sensor based on the first zoom level. The processor is configured to adjust the setting of the first image capture operation based on the second binning level. Further, the processor is configured to receive second image data captured by the first image sensor in accordance with the first binning level. The processor is also configured to apply the image capture operation to the second image data using the adjusted setting. The processor is configured to adjust the first binning level to the second binning level subsequent to the capturing of the second image.

According to another aspect, a non-transitory, machine-readable storage medium stores instructions that, when executed by at least one processor, causes the at least one processor to perform operations comprising receiving first image data captured by a first image sensor in accordance with a first binning level. The operations include applying an image capture operation to the first image data using a setting that is based on the first binning level. The operations further include receiving input data comprising a first zoom level, and determining a second binning level for the first image sensor based on the first zoom level. The operations also include adjusting the setting of the first image capture operation based on the second binning level. The operations further include receiving second image data captured by the first image sensor in accordance with the first binning level. The operations include applying the image capture operation to the second image data using the adjusted setting. Further, the operations include adjusting the first binning level to the second binning level subsequent to the capturing of the second image data.

According to another aspect, an image capture device comprises: a means for receiving input data comprising a first zoom level; a means for receiving first image data captured by a first image sensor in accordance with a first binning level, and applying the image capture operation to the second image data using the adjusted setting; a means for receiving input data comprising a first zoom level; a means for determining a second binning level for the first image sensor based on the first zoom level; a means for adjusting the setting of the first image capture operation based on the second binning level; a means for receiving second image data captured by the first image sensor in accordance with the first binning level, and applying the image capture operation to the second image data using the adjusted setting; and a means for adjusting the first binning level to the second binning level subsequent to the capturing of the second image data.

BRIEF DESCRIPTION OF DRAWINGS

FIGS. 2A, 2B, 2C, and 2D illustrate images captured by an exemplary image capture device, according to some implementations;

DETAILED DESCRIPTION

Figure 1:
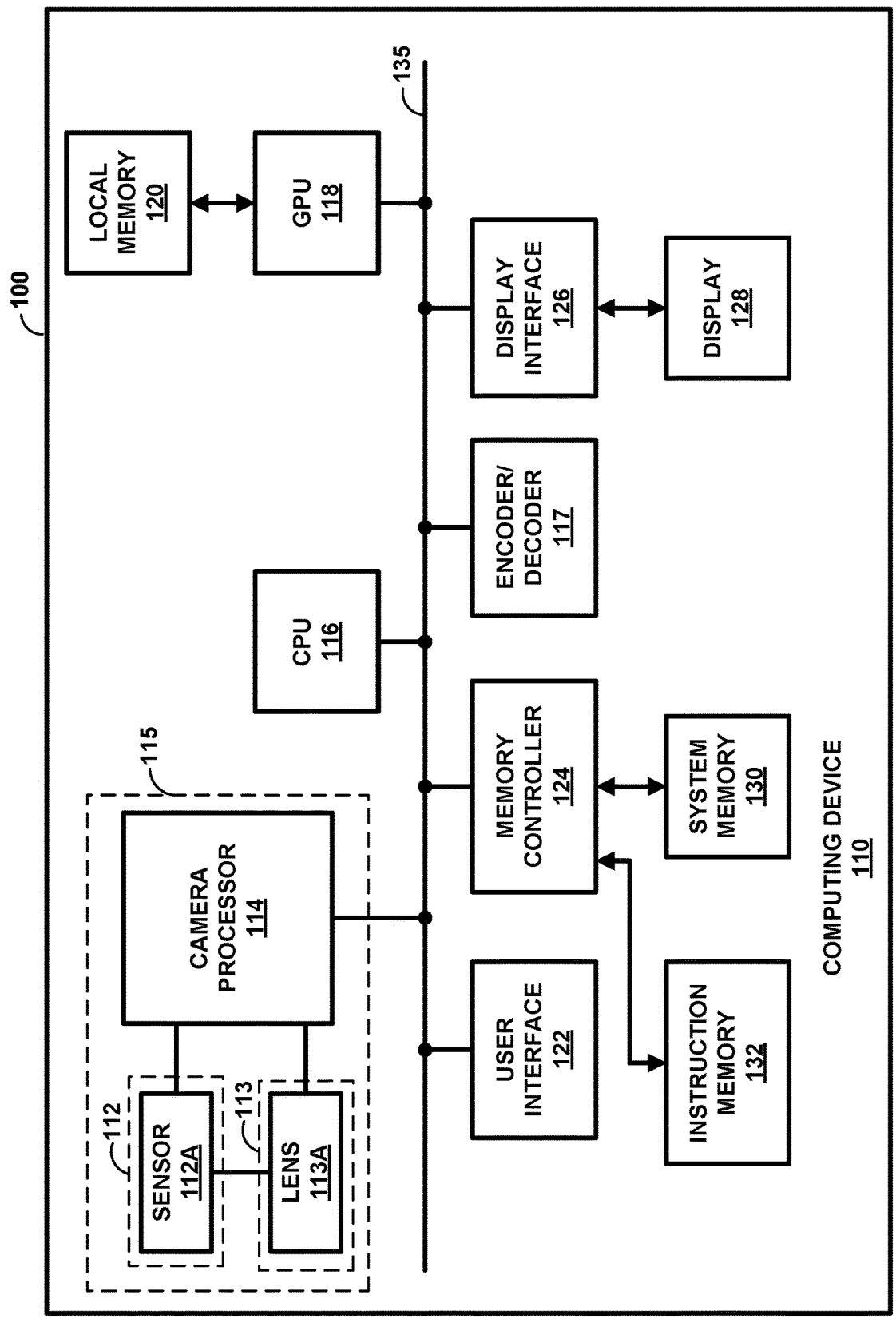
FIG. 1 is a diagram illustrating components of an exemplary image capture device, according to some implementations.

While the features, methods, devices, and systems described herein may be embodied in various forms, some exemplary and non-limiting embodiments are shown in the drawings, and are described below. Some of the components described in this disclosure are optional, and some implementations may include additional, different, or fewer components from those expressly described in this disclosure.

Many imaging devices, such as digital cameras, smartphones, tablet computers, laptop computers, automobiles, or Internet-of-things (IoT) devices (e.g., security cameras, etc.), include imaging assemblies that process captured image data characterizing a target scene using image processing techniques.

By way of example, these imaging assemblies may include one or more optical elements, such as an assembly of one or more lenses (e.g., a lens assembly) that focus incident light onto an imaging sensor disposed at a corresponding imaging plane (e.g., an array of sensing elements formed within a semiconductor substrate). The imaging assemblies may also include a shutter that, when open, allows the incident light to reach sensing elements of the imaging sensor. Each of the sensing elements may collect incident light and generate an electrical signal, which characterizes and measures a value of a luminance of the incident light and, further, a chrominance of the incident light. For example, each of the sensing elements may include color-filtered photodiodes, e.g., to establish red, green, and blue (RGB) color channels.

An image sensor may use various capture modes under various circumstances to capture frames of image data, such as video data or snapshots, using various binning levels. The image capture device may include one or more processors that may configure the binning level to be used by the image sensor. The one or more processors may include, for example, a camera processor, a central processing unit (CPU), or a graphical processing unit (GPU). For example, certain camera processors may cause image sensors to use various binning techniques to capture image data by combining multiple pixels of an image sensor into a fewer number of pixels (e.g., 4×4 binning, 3×3 binning, 2×2 binning, horizontal binning, vertical binning, etc.). The image sensor may then output the combined pixels to the one or more processors. Alternatively, the image sensor may employ non-binning (i.e., no binning) during the image capture process (e.g., the pixels are not combined). As such, the image sensor may provide values of the non-binned pixels (e.g., corresponding to a field of view (FOY) of the image sensor), without combining them, to the one or more processors.

In some instances, a camera processor may employ one or more binning techniques when interfacing with high-resolution or ultra-high resolution image sensors (e.g., 12-megapixels (MP), 48 MP, 64 MP, 108 MP, 120 MP, 144 MP, etc.). For example, the pixel sensors (e.g., pixels) on such image sensors may be characterized by relatively small physical dimensions, and, the incident light on each pixel sensor may be limited, especially in low-light conditions. As a result, each individual pixel may become increasingly susceptible to noise.

The application of the one or more binning techniques by the camera processor may, however, improve signal-to-noise ratios (SNRs) by combining pixels together through various combination schemes, including, but not limited to, averaging or summing multiple pixels together for each output pixel. Further, the application of these binning techniques may also provide higher frame rates for digital cameras, for example, in the case of recording video or providing image previews to a user via a display device. Additionally, or alternatively, the application of these binning techniques may reduce the processing burden and demands placed on the processor of an image capture device, which may reduce an amount of processing performed on image data received from an image sensor, as well as increasing an efficiency of the image capture device.

Further, the image capture device may also enhance, or otherwise alter, captured image data based on one or more image capture operations, which may be performed, at least in part, by the one or more processors. These image capture operations may include, include, but are not limited to, automatic focus (AF), automatic exposure (AE), automatic gain (AG), or automatic white balance (AWB) applied to captured image data.

In some examples, the image capture device may enhance or alternate the captured image data (e.g., based om the performance of one or more of the exemplary image capture operations described herein) based on a change to a zoom level, such as a zoom level change request received from a user of the image capture device. For instance, some digital cameras feature the ability to capture specified portions of a field of zoom (FOZ) (e.g., a potential field-of-view (FOY) of an image sensor), such as with a zoom-in, zoom-out, pinch-to-zoom, panoramic, telescope, telephoto, or periscope feature. The FOZ may be, for example, a portion of an entirety of pixels that a particular image sensor may use to sense a scene or image sequence. Such features allow an image capture device, using the image sensor and, in some examples, a camera processor, to enhance, or otherwise alter, the capture of a scene (or sequence of images, in the case of a video) based on the FOZ and, in some examples, one or more configuration settings (e.g., user settings and/or user manipulations).

Further, in some examples, the image capture device may also adjust the binning level of an image sensor in response to a zoom level change. For instance, an image sensor may be configured (e.g., by a processor) to capture image data at a first binning level. A user of the image capture device may request that a current zoom level be adjusted (e.g., increased) based on a FOZ, and in response, the image capture device may adjust one or more image capture operations, such as AF, AE, AG, or AWB, based on the FOZ (e.g., based on incident light received from the image sensor within the FOZ). If a requested change to the zoom level were to exceed a binning transition threshold, the processor may further cause the image sensor to capture image data using a second binning level, and provide the combined pixels as an output.

Due at least in part to the adjustment to the one or more image capture operations and the binning level adjustment (e.g., from the first to the second binning levels), the captured image data may experience a period of instability before the one or more image capture operations fully converge (e.g., until the AF, AE, AG, or AWB stabilize). This period of instability may cause errors or defects to appear in the captured image data. To reduce these errors or defects, the image capture device may perform operations that preconverge one or more of the image capture operations before any adjustment of the binning level. For example, in response to the request that the current zoom level be adjusted (e.g., based on a FOZ), the image capture device may adjust one or more image capture operations and, after a period of time (e.g., a predetermined amount of time), cause the corresponding image sensor to change binning modes. In some instances, this temporal delay, e.g., for the period of time, may facilitate a convergence of the one or more image capture operations at the image capture device prior to any change in the binning mode or level.

In some examples, the image capture device, using the pixels received from the image sensor, may perform digital zoom techniques to achieve a desired zoom level at, for example, a desired output resolution (e.g., 1080p, 4K, 8K, etc.). The image capture device may perform any number of digital zoom techniques, including, for example, downsampling, cropping, upsampling, scaling, or combinations thereof. In some examples, the image capture device may first crop the pixels received from the image sensor to remove those pixels that fall outside of a FOZ before upsampling or downsampling the remaining pixels. Further, and as the zoom level increases, the image capture device may also adjust one or more image capture operations, and after a predetermined temporal delay after each adjustment, the image capture device may adjusts the binning level. For example, the image capture device may adjust a binning level from a 4×4 configuration to a 2×2 configuration, and then from the 2×2 configuration to no binning, as the zoom level increases.

The image capture device may also include multiple image sensors and/or multiple lenses, and examples of these multiple lenses include, but are not limited to, wide-angle lenses, ultra-wide-angle lenses, telephoto lenses, telescope lenses, periscope-style zoom lenses, fisheye lenses, macro lenses, prime lenses, or various combinations thereof. For example, a dual-camera configuration may include both a wide lens and a telephoto lens. Similarly, a triple-camera configuration may include an ultra-wide lens, in addition to a wide lens and a telephoto lens.

In some instances, the image capture device may toggle from one camera to another camera based on a respective binning level associated with each of the cameras, although in other instances, the image capture device may simultaneously captures images from each of the multiple cameras. Further, each of the image sensors may be configured to capture images using a different, or alternatively, a common, binning level. By incorporating multiple lenses and/or image sensors, the image capture device may capture images with different field of views (FOVs) and/or optical zoom levels. The image capture device may also perform operations that adjust one or more image capture operations, such as AF, AE, AG, or AWB, for each of the multiple lenses and/or image sensors. For example, the image capture device may adjust the image capture operations for each of the multiple lenses and/or image sensors based on a FOZ for each lens. The image sensors may then output a number of pixels and pixel values to one or more processors for further processing, such as for performing digital zoom.

FIG. 1 is a block diagram of an exemplary image capture device 100. The functions of image capture device 100 may be implemented in one or more processors, one or more field-programmable gate arrays (FPGAs), one or more application-specific integrated circuits (ASICs), one or more state machines, digital circuitry, any other suitable circuitry, or any suitable hardware. Image capture device 100 may perform one or more of the example functions and processes described in this disclosure. Examples of image capture device 100 include, but are not limited to, a computer (e.g., personal computer, a desktop computer, or a laptop computer), a mobile device such as a tablet computer, a wireless communication device (such as, e.g., a mobile telephone, a cellular telephone, a satellite telephone, and/or a mobile telephone handset), an Internet telephone, a digital camera, a digital video recorder, a handheld device, such as a portable video game device or a personal digital assistant (PDA), a drone device, or any device that may include one or more cameras.

As illustrated in the example of FIG. 1, image capture device 100 may include one or more image sensors 112, such as image sensor 112A, one or more lenses 113, such as lens 113A, and one or more camera processors, such as camera processor 114. In some instances, camera processor 114 may be an image signal processor (ISP) that employs various image processing algorithms to process image data (e.g., as captured by corresponding ones of these lenses and sensors). For example, camera processor 114 may include an image front end (IFE) and/or an image processing engine (IPE) as part of a processing pipeline. Further, a camera 115 may refer to a collective device including image sensors 112, lenses 113, and camera processor 114.

In some examples, one image sensor 112 may be allocated for each lens 113. In some examples, each of a multiple image sensors 112 may be allocated to a lens 113 of a different type (e.g., wide lens, ultra-wide lens, telephoto lens, and/or periscope lens, etc.). For example, a wide lens 113 may correspond to a first image sensor 112 of a first size (e.g., 108 MP), whereas an ultra-wide lens 113 may correspond to a second image sensor 112 of a different size (e.g., 16 MP). In another example, a telephoto lens 113 may correspond to an image sensor 112 of a third size (e.g., 12 MP). In an illustrative example, a single image capture device 100 may include two or more cameras 115, where at least two of the cameras 115 correspond to image sensors 112 having a same size (e.g., two 12 MP sensors, three 108 MP sensors, three 12 MP sensors, two 12 MP sensors and a 108 MP sensor, etc.). In some examples, a single image sensor 112 may correspond to multiple lenses 113. For example, each of one or more image sensors 112 may correspond to different lenses 113 so as to provide multiple cameras 115 to image capture device 100.

In some examples, not illustrated in FIG. 1, image capture device 100 may include multiple cameras (e.g., a mobile phone having one or more front-facing cameras and one or more rear-facing cameras). For instance, image capture device 100 may include a first camera, such as camera 115 that includes a 16 MP image sensor, a second camera that includes a 108 MP image sensor, and a third camera that includes a 12 MP image sensor.

In some examples, image capture device 100 may include dual "front-facing" cameras. Additionally, in some examples, image capture device 100 may include a "front-facing" camera, such as camera 115, and a rear-facing camera. In other examples, image capture device 115 may include dual "front-facing" cameras, which may include camera 115, and a rear-facing camera. In further examples, image capture device 115 may include three "front-facing" cameras, such as camera 115. It should be noted that a person of skill in the art will appreciate that the techniques of this disclosure may be implemented for any type of camera and for any transitions between any number of cameras of image capture device 100.

In some instances, each camera 115 may include multiple camera processors 114. In some instances, camera processor 114 may be an image signal processor (ISP) that employs various image processing algorithms to process image data (e.g., as captured by lens 113 and sensor 112). In some examples, camera processor 114 may include an image front end (IFE) and/or an image processing engine (IPE) as part of a processing pipeline. In addition, camera 115 may include a single sensor 112 and a single lens 113, in some examples.

As illustrated, image capture device 100 may further include a central processing unit (CPU) 116, an encoder/decoder 117, a graphics processing unit (GPU) 118, a local memory 120 of GPU 118, a user interface 122, a memory controller 124 that provides access to system memory 130 and to instruction memory 132, and a display interface 126 that outputs signals that causes graphical data to be displayed on display 128.

Each of the image sensors 112, including image sensor 112A, may represent an image sensor that includes processing circuitry, an array of pixel sensors (e.g., pixels) for capturing representations of light, memory, an adjustable lens (such as lens 113), and an actuator to adjust the lens. By way of example, image sensor 112A may be associated with, and may capture images through, a corresponding one of lenses 113, such as lens 113A. In other examples, additional, or alternate, ones of image sensors 112 may be associated with, and capture images through, corresponding additional ones of lenses 113.

In some instances, image sensors 112 may include a monochrome sensor (e.g., a "clear" pixel sensor) and/or a color sensor (e.g., a Bayer sensor). For example, a monochrome pixel sensor may be established through a disposition of a monochrome filter over image sensor 112A. Further, in some examples, a color pixel sensor may be established through a disposition of a color filter, such as a Bayer filter, disposed over image sensor 112A, or through a disposition of a red filter, a green filter, or a blue filter may over image sensor 112A. Various other filter patterns exist, such as red, green, blue, white ("RGBW") filter arrays; cyan, magenta, yellow, white (CMYW) filter arrays; and/or variations thereof, including proprietary or non-proprietary filter patterns. Although this disclosure discusses certain examples in terms of particular filter patterns, other filter patterns may be used in accordance with the techniques of this disclosure.

Image sensors 112 may also include a subset of two or more different image sensors operating in conjunction with one another. For example, image sensors 112 may include two different "color" pixel sensors operating in conjunction with one another. The different color pixel sensors may support different binning types and/or binning levels, and although operating in conjunction with one another, the different color pixel sensors may each operate with respect to a particular range of zoom levels. Further, within each zoom level range, each of the different color pixel sensors may transition between various binning levels (e.g., transition from binning to non-binning modes). For example, camera processor 114 may cause two or more of image sensors 112 operating in conjunction with one another (e.g., the different color pixel sensors described herein) to each transition between various binning levels independently and in accordance with a respective binning transition thresholds, e.g., as stored in system memory 130.

Further, in some examples, multiple ones of lenses 113 may be associated with, and disposed over, respective subsets of image sensors 112. For instance, a first subset of sensors 112 may be allocated to a first one of lenses 113 (e.g., a wide lens camera, ultra-wide lens camera, telephoto lens camera, periscope lens camera, etc.), and a second subset of image sensors 112 may be allocated to a second one of lenses 113 distinct from the first subset. In some instances, each of lenses 113 may serve respective functions as provided by various attributes of the cameras (e.g., lens attributes, aperture attributes, angle-of-view attributes, thermal imaging attributes, etc.), and a user of image capture device 100 may leverage the various attributes of each of lenses 113 to capture one or more images or sequences of images (e.g., as in a video recording).

Additionally, in some instances, image capture device 100 may receive user input via user interface 132, and response to the received user input, CPU 116 and/or camera processor 114 may activate respective ones of lenses 113, or combinations of lenses 113. For example, the received user input may corresponding a user selection of lens 113A (e.g., a fisheye lens), and based on the received user input, CPU 116 may select an initial one of lenses 113 to activate and additionally, or alternatively, may transition from the initially selected lens to another one of lenses 113.

In other examples, CPU 116 and/or camera processor 114 may detect an operating condition that satisfies certain lens-selection criteria (e.g., digital zoom level satisfying a predefined camera transition threshold, a change in lighting conditions, input from a user calling for a particular lens 13, etc.), and may select the initial one of lenses 113, such as lens 113A, for activation based on the detected operating condition. In some examples, image capture device 100 may include multiple ones of camera 115, which may collectively capture one synthetic image or stream of synthetic images, such that camera processor 114 or CPU 116 may process one synthetic image or stream of synthetic images based on image data captured from sensors 112.

In some examples, each of lenses 113 and image sensors 112 may operate collectively to provide various optical zoom levels, angles of view (AOV), focal lengths, and FOVs.

Further, light guides may be used to direct incident light from lenses 113 to a respective one of sensors 112, and examples of the light guides may include, but are not limited to, a prism, a moving prism, or one or more mirrors. For instance, light received from lens 113A may be redirected from image sensor 112A toward another one of image sensors 112. Further, in some instances, camera processor 114 may perform operations that cause a prism to move and redirect light incident lens 113A in order to effectively change the focal length for the received light.

Further, as illustrated in FIG. 1, a single camera processor, such as camera processor 114, may be allocated to and interface with all, or a selected subset, of image sensors 112. In other instances, multiple camera processors may be allocated to and interface with all, or a selected subset, of image sensors 112, and each of the camera processors may coordinate with one another to efficiently allocate processing resources to the all, or the selected subset, of image sensors 112. For example, and through the execution of stored instructions, camera processor 114 may implement multiple processing algorithms under various circumstances to perform digital zoom operations or other image processing operations.

Although the various components of image capture device 100 are illustrated as separate components, in some examples, the components may be combined to form a system on chip (SoC). As an example, camera processor 114, CPU 116, GPU 118, and display interface 126 may be implemented on a common integrated circuit (IC) chip. In some examples, one or more of camera processor 114, CPU 116, GPU 118, and display interface 126 may be implemented in separate IC chips. Various other permutations and combinations are possible, and the techniques of this disclosure should not be considered limited to the example illustrated in FIG. 1.

System memory 130 may store program modules and/or instructions and/or data that are accessible by camera processor 114, CPU 116, and GPU 118. For example, system memory 130 may store user applications (e.g., instructions for the camera application) and resulting images from camera processor 114. System memory 130 may additionally store information for use by and/or generated by other components of image capture device 100. For example, system memory 130 may act as a device memory for camera processor 114. System memory 130 may include one or more volatile or non-volatile memories or storage devices, such as, for example, random access memory (RAM), static RAM (SRAM), dynamic RAM (DRAM), read-only memory (ROM), erasable programmable ROM (EPROM), electrically erasable programmable ROM (EEPROM), flash memory, a magnetic data media, cloud-based storage medium, or an optical storage media.

Camera processor 114 may store data to, and read data from, system memory 130. For example, camera processor 114 may store a working set of instructions to system memory 130, such as instructions loaded from instruction memory 132. Camera processor 114 may also use system memory 130 to store dynamic data created during the operation of image capture device 100.

Similarly, GPU 118 may store data to, and read data from, local memory 120. For example, GPU 118 may store a working set of instructions to local memory 120, such as instructions loaded from instruction memory 132. GPU 118 may also use local memory 120 to store dynamic data created during the operation of image capture device 100. Examples of local memory 120 include one or more volatile or non-volatile memories or storage devices, such as RAM, SRAM, DRAM, EPROM, EEPROM, flash memory, a magnetic data media, a cloud-based storage medium, or an optical storage media.

Instruction memory 132 may store instructions that may be accessed (e.g., read) and executed by camera processor 114. For example, instruction memory 132 may store instructions that, when executed by camera processor 114, cause camera processor 114 to perform one or more of the operations described herein. Instruction memory 130 may include read-only memory (ROM) such as EEPROM, flash memory, a removable disk, CD-ROM, any non-volatile memory, any non-volatile memory, or any other suitable memory.

The various components of image capture device 100, as illustrated in FIG. 1, may be configured to communicate with each other across bus 135. Bus 135 may include any of a variety of bus structures, such as a third-generation bus (e.g., a HyperTransport bus or an InfiniBand bus), a second-generation bus (e.g., an Advanced Graphics Port bus, a Peripheral Component Interconnect (PCI) Express bus, or an Advanced eXtensible Interface (AXI) bus), or another type of bus or device interconnect. It is to be appreciated that the specific configuration of components and communication interfaces between the different components shown in FIG. 1 is merely exemplary, and other configurations of the components, and/or other image processing systems with the same or different components, may be configured to implement the operations and processes of this disclosure.

Camera processor 114 may be configured to receive image frames (e.g., pixel data, image data) from image sensors 112, and process the image frames to generate image and/or video content. For example, image sensor 112A may be configured to capture individual frames, frame bursts, frame sequences for generating video content, photo stills captured while recording video, image previews, or motion photos from before and/or after capture of a still photograph. CPU 116, GPU 118, camera processor 114, or some other circuitry may be configured to process the image and/or video content captured by image sensor 112A into images or video for display on display 128. In an illustrative example, CPU 116 may cause image sensor 112A to capture image frames using pixel binning, and may receive pixel data from image sensor 112A. In the context of this disclosure, image frames may generally refer to frames of data for a still image or frames of video data or combinations thereof, such as with motion photos. Camera processor 114 may receive, from image sensors 112, pixel data of the image frames in any suitable format. For instance, the pixel data may be formatted according to a color format such as RGB, YCbCr, or YUV.

In some examples, camera processor 114 may include an image signal processor (ISP). For instance, camera processor 114 may include an ISP that receives signals from image sensors 112, converts the received signals to image pixels, and provides the pixel values to camera processor 114. Additionally, camera processor 114 may be configured to perform various operations on image data captured by image sensors 112, including auto gain, auto white balance, color correction, or any other image processing operations.

Memory controller 124 may be communicatively coupled to system memory 130 and to instruction memory 132. Memory controller 124 may facilitate the transfer of data going into and out of system memory 130 and/or instruction memory 132. For example, memory controller 124 may receive memory read and write commands, such as from camera processor 114, CPU 116, or GPU 118, and service such commands to provide memory services to system memory 130 and/or instruction memory 132. Although memory controller 124 is illustrated in the example of FIG. 1 as being separate from both CPU 116 and system memory 130, in other examples, some or all of the functionality of memory controller 124 with respect to servicing system memory 130 may be implemented on one or both of CPU 116 and system memory 130. Likewise, some or all of the functionality of memory controller 124 with respect to servicing instruction memory 132 may be implemented on one or both of CPU 116 and instruction memory 132.

Camera processor 114 may also be configured, by executed instructions, to analyze image pixel data and store resulting images (e.g., pixel values for each of the image pixels) to system memory 130 via memory controller 124. Each of the images may be further processed for generating a final image for display. For example, GPU 118 or some other processing unit, including camera processor 114 itself, may perform color correction, white balance, blending, compositing, rotation, digital zoom, or any other operations to generate the final image content for display.

In addition, image capture device 100 may include a video encoder and/or video decoder 117, either of which may be integrated as part of a combined video encoder/decoder (CODEC). Encoder/decoder 117 may include a video coder that encodes video captured by one or more camera(s) 115 or a decoder that decodes compressed or encoded video data. In some instances, CPU 116 may be configured to encode and/or decode video data using encoder/decoder 117.

CPU 116 may comprise a general-purpose or a special-purpose processor that controls operation of image capture device 100. A user may provide input to image capture device 100 to cause CPU 116 to execute one or more software applications. The software applications executed by CPU 116 may include, for example, a camera application, a graphics editing application, a media player application, a video game application, a graphical user interface application or another program. For example, an executed camera application may allow the user to control various settings of camera 115, e.g., via input provided to image capture device 100 via user interface 122. Examples of user interface 122 include, but are not limited to, a pressure-sensitive touchscreen unit, a keyboard, a mouse, or an audio input device, such as a microphone. For example, user interface 122 may receive input from the user to adjust desired zoom levels (e.g., digital zoom levels), alter aspect ratios of image data, record video, take a snapshot while recording video, apply filters when capturing images, select a region-of-interest (ROI) (e.g., a FOZ) for AF, AE, AG, or AWB operations, record slow motion video or super slow motion video, apply night shot settings, and/or capture panoramic image data, among other examples.

By way of example, CPU 116 may execute the camera application and, the executed camera application may cause CPU 116 to generate content that is displayed on display 128. For instance, display 128 may display information such as a preview of an image as captured by one or more of sensors 112, a configured light intensity, whether flash is enabled, and other such information. The user of image capture device 100 may interface with display 128 (e.g., via user interface 122) to configure the manner in which the images are generated (e.g., with or without flash, focus settings, exposure settings, gain settings, white balance settings, as well as other settings or parameters). The executed camera application may also cause CPU 116 to instruct camera processor 114 to process the images captured by sensor 112 in a user-defined manner. For example, CPU 116 may instruct camera processor 114 to perform a zoom operation on the images captured by one or more of sensors 112, e.g., in response to a request to zoom provided by the user via user interface 122. The request for zoom may include, but is not limited to, a pinch-to-zoom command, a discrete input, such as operation of a 0.5× zoom button, 2× zoom button, 3× zoom button, 10× zoom button, etc., a slider input, or some combination thereof.

Further, in some examples, a zoom operation may include a digital zoom defined by a zoom field (e.g., the FOZ described herein). For instance, a zoom field may include a portion of less than the full FOV of sensor 112. CPU 116 may instruct camera processor 114 to perform the digital zoom operation based on the zoom field.

As described herein, camera processor 114 may perform operations that cause image sensors 112 to capture frames of image data, such as video data, using various levels of binning, including non-binning. For example, when camera processor 114 receives a zoom request, camera processor 114 may determine whether the zoom request satisfies a predefined binning transition threshold, at which point camera processor 114 may cause image sensor 112A to capture subsequent frames using an altered binning level, e.g., an increased or decreased binning level.

In some instances, one or more of image sensors 112, such as image sensor 112A, may initially capture image data at a 2×2 binning level, where four pixels are combined into one output pixel. For example, image sensor 112A may include a 108 MP image sensor that corresponds to a wide angle lens, and using a 2×2 binning level, may combine for pixels to generate each output pixel of image data, thereby transferring 27 MP of image data to camera processor 114. In another example, image sensor 112A may initially capture image data at a 3×3 binning level, where nine pixels are combined into one output pixel. As such, using the 3×3 binning level, image sensor 112A may combine nine pixels into each generated output pixel of image data, thereby transferring 12 MP of image data to camera processor 114.

Additionally, in some examples, camera processor 114 may receive a desired zoom level defined by a corresponding FOZ (e.g., based on user input provided to user interface 122), and may determine that the desired zoom level exceeds a first predefined threshold. Based on the determination that the desired zoom level exceeds the first threshold value, camera processor 114 may perform operations that configured one or more image capture operations, such as AF, AG, AE, or AWB, to converge to the FOZ. For example, subsequent to configuring the one or more image capture operations, camera processor 114 may receive generated output pixels of image data from image sensor 112A, and may apply the one or more configured image capture operations to the received output pixels. After a predetermined amount of time (e.g., 10 frames subsequent to the configuration of the one or more image capture operations), camera processor 114 may further cause one or more of image sensors 112 to transition from an initial binning level to another binning level. For example, assuming that the desired zoom level has increased (e.g., a desired zoom in) beyond the first predefined threshold, camera processor 114 may cause image sensor 112A to transition from a 2×2 binning mode to a non-binning mode after the predetermined amount of time. In the non-binning mode, image sensor 112A (e.g., a 108 MP image sensor) may output a value of each pixel as image data, and as such, may transfer 108 MP of image data to camera processor 114.

Similarly, and when the desired zoom level decreases (e.g., via a zoom out) below the first predefined threshold, camera processor 114 may cause one or more of image sensors 112, such as image sensor 112A, to transition from a non-binning mode to a 2×2 binning mode after the predetermined amount of time. Under such circumstances, image sensor 112A, e.g., the 108 MP sensor described herein may combine four sensor pixels into a corresponding output pixel of the image data, and may output 27 MP of image data to camera processor 114.

In addition, camera processor 114 may use digital cropping, downsampling, upsampling, or scaling to achieve a desired zoom level at a desired resolution (e.g., 1080p, etc.). The desired digital resolution may be identified, for example, by a desired resolution parameter stored in system memory 130. In one illustrative example, camera 115, having a 48 MP image sensor (e.g., image sensor 112A) with a single lens (e.g., lens 113A), may capture a maximum pixel array of roughly 8000×6000 pixels (e.g., a maximum number of pixels). Camera 115, using the 48 MP image sensor, may be configured to capture so-called 4K picture or video, where the resolution for such picture or video is approximately 4000×2000 pixels or approximately 8 MP. Thus, in the case of a digital zoom operation, the 48 MP image sensor may potentially output 48 MP of non-binned image data to camera processor 114, where camera processor 114 may perform digital cropping of the 8000×6000 pixels to achieve the desired zoom level.

In further examples, camera processor 114 may also perform other operations, such as downsampling, for instances where the number of pixels remaining after the digital crop is greater than the desired resolution. Camera processor 114 may also perform upsampling, such as in instances where the number of pixels remaining after a digital crop is less than the desired resolution.

In an example where image sensor 112A performs binning at a 2×2 binning level, a 48 MP image sensor (e.g., image sensor 112A) may output 12 MP of binned image data to camera processor 114, where camera processor 114 may perform digital cropping of the 12 MP to achieve the desired zoom level prior to performing downsampling, upsampling, or scaling techniques to achieve the desired zoom level at the desired resolution.

In some examples, camera processor 114 may be configured to receive image data from camera 115 (e.g., representative of image captured by sensors 112), and may receive a request from the user via user interface 122 to change a current zoom level to a desired zoom level. Camera processor 114 may further determine that the digital zoom level exceeds a camera transition threshold, and thus that images are to be captured from an additional camera of image capture device 100 (not illustrated in FIG. 1) in order to accommodate the desired zoom level.

The additional camera may, for instance, be configured by a corresponding camera processor (e.g., executing instructions stored in instruction memory 132, etc.) to bin pixels at a binning level different from a corresponding binning level implemented by camera 115. By way of example, the additional may be configured to perform binning at 2×2 binning level, while the camera 115 may be configured to perform no binning. In some instances, camera processor 114 may initially configure one or more image capture operations, such as AG, AE, AF, or AWB, for the additional camera based on the desired zoom level, and upon expiration of the predetermined time period described herein, camera processor 114 may switch from the camera 115 to the additional camera, and may receive image data captured by the one or more image sensors of the additional camera in accordance with the desired zoom level.

In some instances, camera processor 114 may, upon execution of stored instructions, perform further operations that transition corresponding ones of image sensors 112 between binning levels upon an expiration of a corresponding, and distinct, predetermined time period. For example, camera processor 114 may be configured to transition a first one of image sensors 112, such as image sensor 112A, from one binning level to another binning level upon expiration of a first predetermined time period, and may be further configured to transition a second one of image sensors 112 (not illustrated in FIG. 1) from one binning level to another binning level upon expiration of a second predetermined time period. The first and second predetermined time periods may differ.

In other examples, CPU 116, in conjunction with one or more of the camera processors described herein, may perform operations that activate various lenses of corresponding cameras, for example, based on the desired zoom level. In some instances, as described herein, image capture device 100 may include multiple cameras, each of which include a corresponding camera processor, one or more image sensors, and one or more lenses. For example, image capture device 100 may include a first camera, such as camera 115, and lens 113A of camera 115 may correspond to a telephoto lens. Further, image capture device 100 may also include a second camera (not illustrated in FIG. 1) having a wide-angle lens.

During a transition from the wide-angle lens of the second camera to the telephoto lens of the first camera (e.g., lens 113A of camera 115), CPU 116 may perform operations that cause camera processor 114 to activate the telephoto lens of camera 115 at a requested zoom level (e.g., five times zoom (5×), 10× zoom, 15× zoom, etc.), and that cause the corresponding camera processor of the second camera to deactivate the wide angle lens of the second camera. For example, to facilitate the transition, CPU 116 may perform operations that cause camera processor 114 to configure one or more image capture operations, such as AG, AE, AF, or AWB, for the camera 115 based on the desired zoom level (e.g., a FOZ). Upon expiration of a predetermined time period amount of time, CPU 116 may perform additional operations that switch from the wide angle lens of the second camera to the telephoto lens of the camera 115 (e.g., lens 113A), and that deactivate the second camera.

In further examples, although not illustrated in FIG. 1, each poof the multiple cameras of image capture device 100 may be associated with a common subset of image sensors, such as image sensors 112. For instance, each of camera 115 and the second camera described herein may be associated with, and may capture image data using, image sensor 112A of image sensors 112. Nonetheless, despite sharing a common subset of image sensors 112, each of camera 115 and the second camera of image capture device 100 may provide different effective focal lengths, for example, due to different lenses being used or the activation of moving prisms.

Further, and by way of example, camera processor 114 of camera 115 may configure image sensor 112A to bin pixels at a first binning level. To transition from the camera 115 to the second camera, CPU 116 may perform operations that cause the camera processor of the second camera to configure one or more image capture operations, such as AG, AE, AF, or AWB, for the second camera based on a desired zoom level (e.g., as received from a user via user interface 122). Upon expiration of a predetermined time period (e.g., since configuring the image capture operations for the second camera), camera processor 114 may configure the image sensor 112 to bin pixels at a second binning level. CPU 116 may perform further operations that transition from the camera 115 to the second camera, e.g., by deactivating camera 115. Subsequent to the transition, the second camera may capture image data using corresponding image sensors that bin pixels at a second binning level.

Camera processor 114, CPU 116, and GPU 118 may store image data, such as image data captured from one or more of image sensors 112, in respective buffers that are allocated within system memory 130. Display interface 126 may retrieve the image data from system memory 130 and configure display 128 to display images represented by the retrieved image data. In some examples, display interface 126 may include a digital-to-analog converter (DAC) that is configured to convert digital pixel values retrieved from system memory 130 into an analog signal consumable by display 128. In other examples, display interface 126 may pass the digital values directly to display 128 for processing.

Display 128 may include a monitor, a television, a projection device, a liquid crystal display (LCD), a plasma display panel, a light emitting diode (LED) array, an organic LED (OLED), a cathode ray tube (CRT) display, electronic paper, a surface-conduction electron-emitted display (SED), a laser television display, a nanocrystal display or another type of display unit. Display 128 may be integrated within image capture device 100. For instance, display 128 may be a screen of a mobile telephone handset, a tablet computer, or a laptop. Alternatively, display 128 may be a standalone device coupled to image capture device 100 via a wired or wireless communications link. For instance, display 128 may be a computer monitor or flat panel display connected to a personal computer via a cable or wireless link.

FIGS. 2A-2D illustrate images captured by image capture device 100 using the exemplary image-capture processes described herein. For example, camera processor 114 of image capture device 100 may initiate capture of a video or image of a scene using a plurality of pixel sensors of sensor 112. In some examples, a video may include a sequence of individual frames. In some examples, camera processor 114 causes sensor 112 to capture an image of scene 202 using the plurality of pixel sensors. Sensor 112 may then output pixel information (e.g., pixel values, luma values, color values, charge values, Analog-to-Digital Units (ADU) values, etc.) to camera processor 114, where the pixel information represents the captured image or sequence of captured images for each sensor 112. In some examples, camera processor 114 may process monochrome images and/or color images to obtain an enhanced color image of the scene.

Figure 2A:
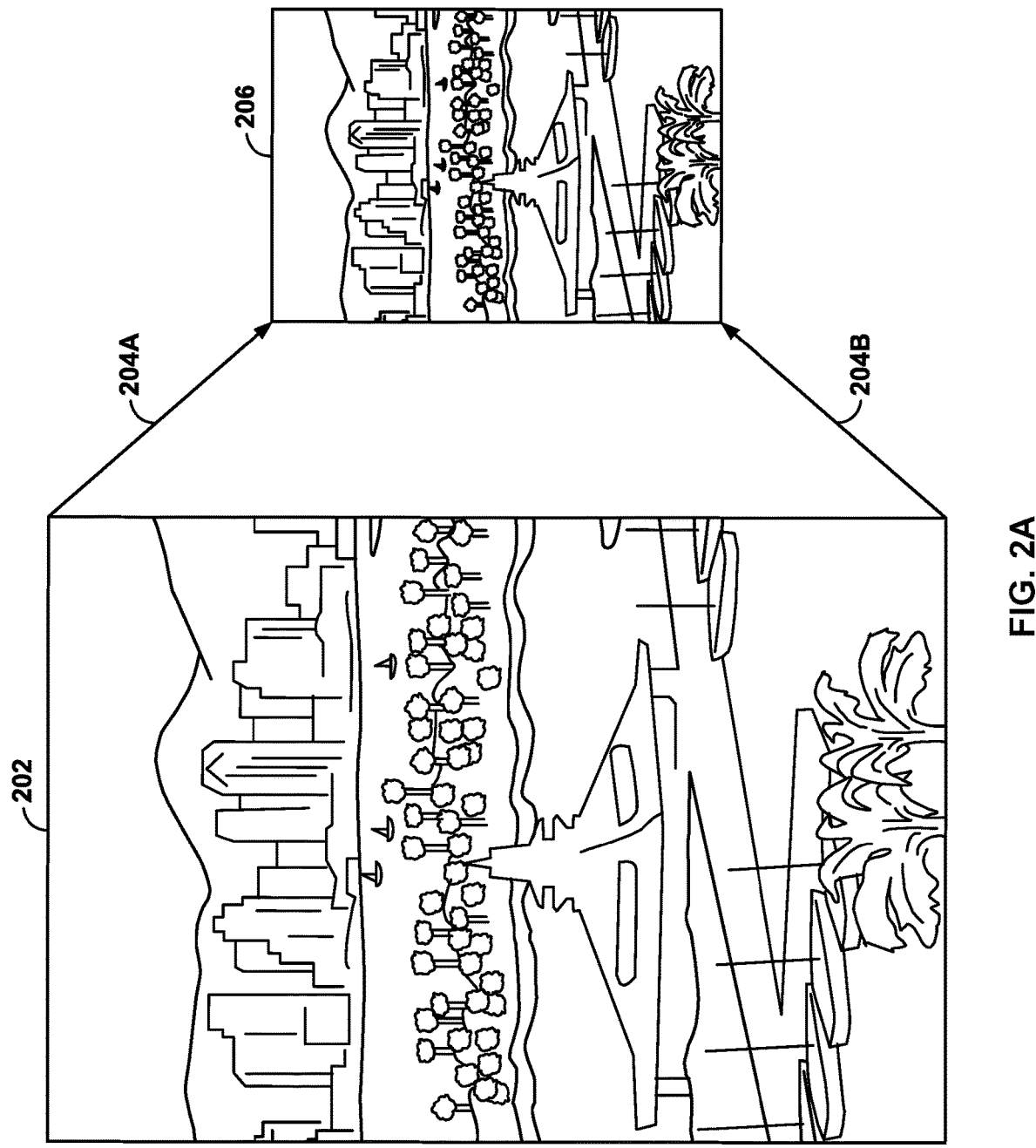

For example, and with reference to FIG. 2A, image sensors 112 of image capture device 100 may capture a scene 202, which may include discrete values for each pixel sensor of image sensors 112. That is, the capture of any scene, video or still capture, would include 100% of the pixel sensors covering the full FOV of image sensor 112 as image data (e.g., light) enters image sensor 112. Scene 202 may be a still shot and/or an image capture taken during a video recording. For example, a single frame of a video may resemble the image of the scene 202.

Camera processor 114 may cause image sensors 112 to capture one or more frames of image data (e.g., video data of scene 202) using a first image capture mode 204A/204B. The first image capture mode may include a binning operation. In some examples, the first image capture mode includes a first binning level that uses two or more pixels of image sensor 112 for each output pixel.

In one example, camera processor 114 may cause image sensor 112 to capture one or more frames of scene 202 using a first binning mode that combines four pixels of image sensor 112 for each output pixel. For example, image sensor 112 may capture the frames using a 2×2 binning level that combines four neighboring pixels each output pixel. In such examples, image sensor 112 may output 25% fewer pixels than the maximum number of pixels possible to camera processor 114, as shown by first binned frame 206 (e.g., first binned frame 206 is one-fourth the size of scene capture 202). As a result of the binning process, the output pixels may be characterized by a higher signal-to-noise ratio (SNR) at the cost of spatial resolution. Camera processor 114 may also receive a reduced amount of data from sensor 112 through the implementation of the first binning mode (e.g., as compared to comparable image data captured in a non-binning mode), which may be advantageous for image sensors having high pixel sensor counts.

In an illustrative example, an image sensor having 108 MP (e.g., image second 112A of FIG. 1) may perform 2×2 binning, which combines each of four neighboring pixels are combined into a corresponding output pixel, and may transfer each of the output pixels to camera processor 114 (e.g., as pixel data identifying a pixel value). Thus, instead of receiving 108 MP from image sensor 112A for each frame, camera processor 114 may receive, and thus process, 27 MP for each image frame. In this way, a 108 MP sensor may provide a 27 MP image through binning, which may result in a reduction in a processing burden for camera processor 114 and an improved SNR. While certain example binning techniques are described herein, the example binning techniques are not so limited, and as such, image sensors 112, including image sensor 112A, may employ various binning techniques depending on specific pixel sensor patterns and/or other advancements in binning technology.

In some examples, camera processor 114 may perform digital zoom techniques using pixel data from first binned frame 206. Depending on a desired resolution of the image data, camera processor 114 may perform cropping, upsampling, downsampling, or scaling operations, or combinations thereof, on the pixel data from first binned frame 206. For example, camera processor 114 may crop the pixel data (of first binned frame 206) to achieve a desired zoom level, and then may upsample or downsample depending on the number of cropped pixels as it compares to the desired resolution. For example, if the number of cropped pixels is less than the desired resolution, camera processor 114 may upsample by interpolating between cropped pixels to insert additional pixels between the cropped pixels, thereby increasing the number of pixels, until the desired resolution is achieved.

Further, an amount of cropping, downsampling, and upsampling performed by camera processor 114 during digital-zoom operations may depend on a maximum number of pixels provided by image sensors 112 and a desired output resolution. For example, where image sensors 112 provide more output pixels that necessary to obtain the desired output resolution, camera processor 114 may perform cropping and downsampling operations to achieve the desired zoom level at the desired output resolution. As the zoom level increases, camera processor 114 may crop pixels and as the zoom level continues to increase beyond the maximum number of pixels provided by image sensors 112, camera processor 114 may perform cropping and upsampling operations to achieve the desired zoom level at the desired output resolution.

Figure 2B:
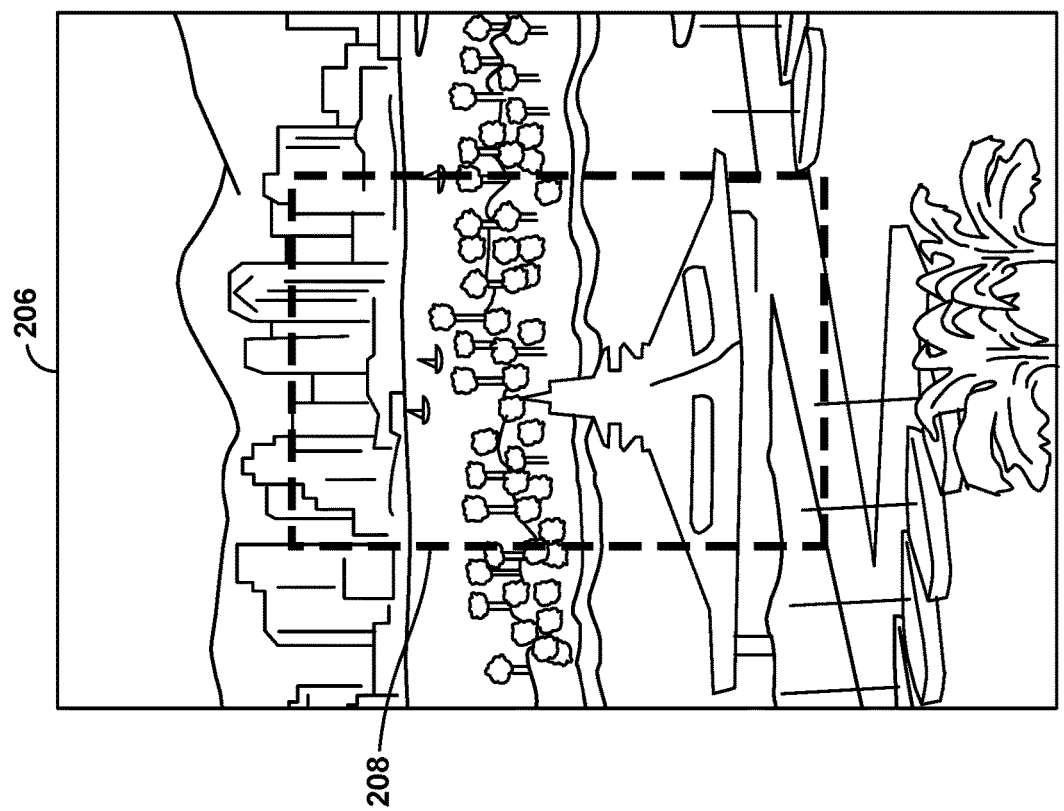

FIG. 2B illustrates a zoom field 208 of first binned frame 206. For example, camera processor 114 may receive a desired zoom level (e.g., from a user via user interface 122 of FIG. 1) that includes a portion of first binned frame 206, e.g., zoom field 208. In some examples, the zoom level may be set by the user, for example, by performing a pinch-to-zoom operation, using a sliding zoom bar, or some other input configured to cause a zoom operation, such as a visual or audible gesture (e.g., voice command or visual cue), remote signal, or a manipulation of the camera (e.g., twisting a lens piece). In some examples, the zoom level may be set to automatically change in response to the user setting, such as a timer setting or programmed routine.

By way of example, the user may perform the pinch-to-zoom operation on a portion of a display surface of display 128, e.g., during an image preview prior to capturing scene 206, or during a video capture operation. In such instances, zoom field 208 may include the portion of pixels of first binned frame 206 that corresponds to the pinch-to-zoom operation. Camera processor 114 performs digital zoom operations on the pixels within zoom field 208 to achieve a desired zoom level at a desired resolution.

As illustrated in FIG. 2B, zoom field 208 is represented visually as a dashed box having dimensions that vary based on the desired zoom level. In some examples, a geometry of zoom field 208 may be consistent with a corresponding geometry of image sensors 112 (e.g., rectangular). In other instances, zoom field 208 may be of a different geometry compared to that of image sensor 112, and may include, but is not limited to, a square, circle, or some other shape that encloses at least a portion of first binned frame 206. Further, in some examples, zoom field 208 may be specified by a user (e.g., via user interface 122) or may be the result of an automatic zoom operation.

Based on zoom field 208, image sensors 112 may output to camera processor 114, a reduced portion of binned or non-binned pixels that correspond to a region of interest within first binned frame 206, e.g., zoom field 208. While zoom filed 208 is used here as an example, the techniques of this disclosure are not so limited, and a person skilled in the art will understand that other regions of interest may be used for such zoom operations.

For example, camera processor 114 may receive data indicative of a desired zoom level of 2× zoom (e.g., from a user via user interface 122). Camera processor 114 may also be associated with a binning transaction threshold of a 2× zoom level, which may be stored within system memory 130. As described herein, the binning transaction threshold may be associated with transition of image sensors 112 from a first binning level (e.g., the first binning level of FIG. 2A) to a second binning level. Before the transition of image sensors 112 from the first binning level to the second binning level, camera processor 114 may configure one or more image capture operations, such as AE, based on the desired zoom level (in this example, 2× zoom), and upon expiration of a predetermined time period (e.g., also maintained within system memory 130), camera processor 114 may transition image sensor 112 from the first binning mode to the second binning mode. For example, camera processor 114 may configure the image capture operations at least a predetermined number of frames (e.g., 10) before transitioning image sensors 112 from the first binning mode to the second binning mode.

FIG. 2C illustrates a performance of a zoom operation by image sensors 112. In this example, camera processor 114 receives data indicative of a desired zoom level (e.g., from the user via user interface 123). The desired zoom level may, in some instances, include a portion of first binned frame 206, e.g., as represented by zoom field 208 of FIG. 2B. Based on the receipt of the data indicative of the desired zoom level, camera processor 114 may configure one or more image capture operations based on zoom field 208, and upon expiration of the predetermined time period (e.g., the 10 frames), camera processor 114 may perform operations that cause image sensors 112 to transition from the first binning level to the second binning level.

Arrows 210A/210B illustrate the difference in the amount of image data captured for first binned frame 206 using the first binning level compared to the amount of image data captured for second binned frame 212 using the second binning level. For example, assuming the first binning level is 2×2 binning and the second binning level corresponds to a no binning mode, the amount of image data captured using the second binning level may be four times the amount of image data captured using the first binning level.

As an example, image sensors 112 may include a 108 MP image sensor (e.g., image sensor 112A) configured to perform binning at a 2×2 binning level (e.g., the first binning level). In this example, the 108 MP image sensor may combine each set of four neighboring pixels are combined into a corresponding output pixel, and may transfer each output pixel to camera processor 114. Thus, camera processor 114 receives 27 MP of image data from the 108 MP image sensor for each captured frame. Additionally, subsequent to the adjustment of the one or more image capture operations (e.g., AF, AE, AG, or AWB), and upon expiration of the predetermined time period, camera processor 114 may further configure image sensors 112 to operate at a second binning level, such as a no-binning mode. After the transition from the first binning level to the second binning level, the 108 MP image sensor transfers 108 MP of image data to camera processor 114 for each captured frame.

Figure 2D:

FIG. 2D illustrates an image 220 captured using the second binning level of FIG. 2C in response to the zoom operation of FIG. 2B. For example, image 220 may represent a portion of second binned frame 212 corresponding to zoom field 208.

A person of skill in the art will understand that the type of pixel binning shown in FIGS. 2A, 2B, 2C, and 2D are merely for illustrative purposes and that image sensors 112 may employ other pixel binning types, such as those described herein.

Figure 3:
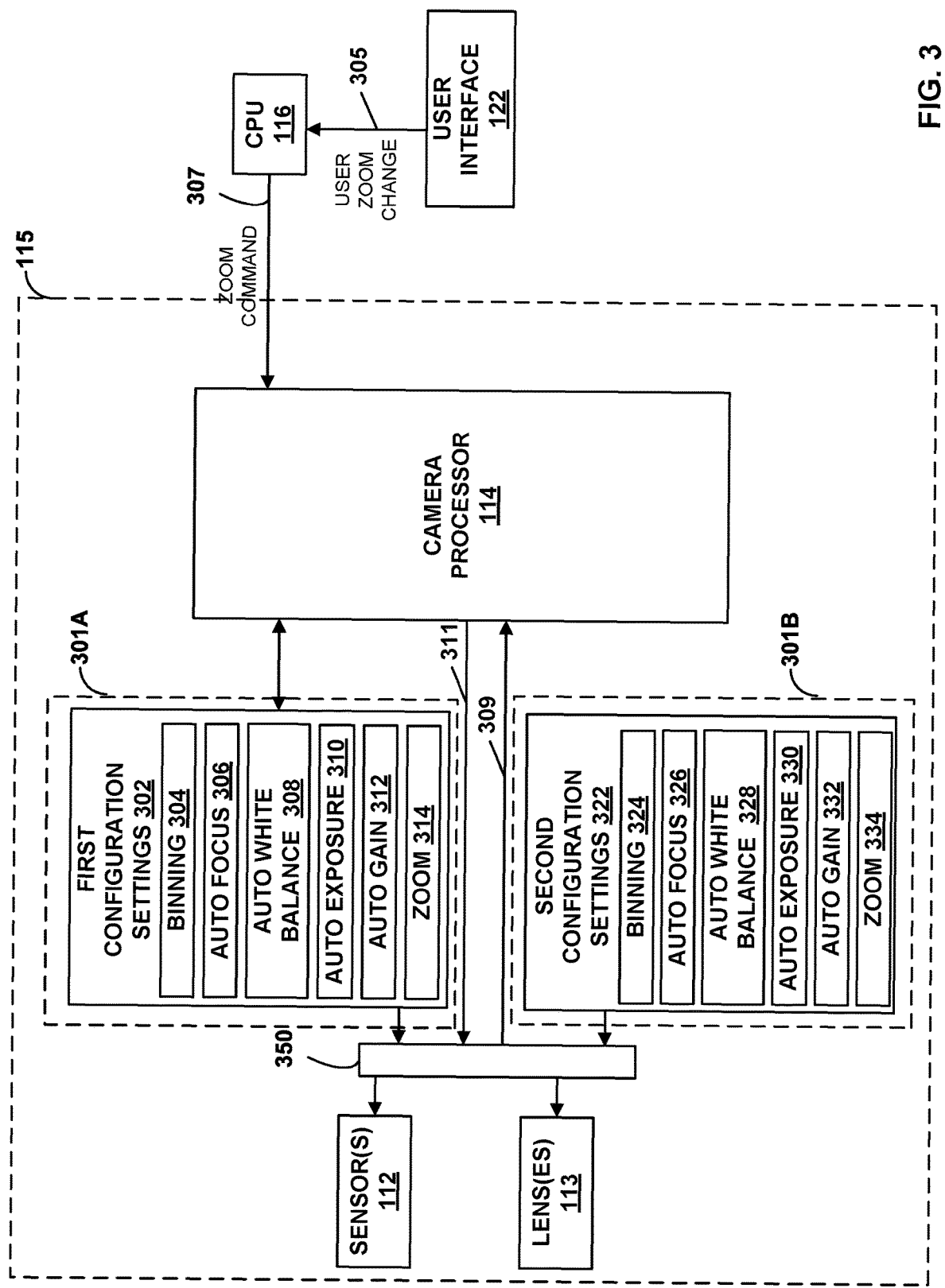
FIG. 3 is a diagram illustrating exemplary components of an exemplary image capture device, according to some implementations.

FIG. 3 illustrates exemplary components of image capture device 100. In this example, camera 115 may maintain first configuration settings 302 and second configuration settings 322 within respective portions 301A and 301B of a non-volatile storage medium, such as an EPROM, EEPROM, or flash memory. Each of first configuration settings 302 and second configuration settings 322 may include configuration settings for one or more image capture operations. For instance, first configuration settings 302 includes configuration settings for binning 304 (e.g., 2×2 binning, 4×4 binning, no binning, etc.), auto focus 306, auto white balance 308, auto exposure 310, auto gain 312, and zoom 314. Similarly, second configuration settings 322 includes configuration settings for binning 324, auto focus 326, auto white balance 328, auto exposure 330, auto gain 332, and zoom 334.

Each of portions 301A and 301B of the non-volatile storage medium may be communicatively coupled to an interface 350. Interface 350 allows each of image sensors 112 to be configured according to corresponding configuration settings in first configuration settings 302 and second configuration settings 322. For example, interface 350 may be a multiplexing device that may be configured to select and provide, to each of image sensors 112 and lenses 113, configuration settings from either first configuration settings 302 or second configuration settings 322. In some examples, first configuration settings 302 correspond to a first image capture mode and second configuration settings 322 correspond to a second image capture mode.

Camera processor 114 may be communicatively coupled to portions 301A and 301B of the non-volatile storage medium and interface 350. Camera processor 114 may configure (e.g., set, adjust, clear, etc.) the configuration settings in each of first configuration settings 302 and second configuration settings 322. Further, camera processor 114 may cause interface 350, via communication link 311, to select configuration settings for each of image sensors 112 and lenses 113 from either first configuration settings 302 or second configuration settings 322.

In some examples, image sensors 112 and/or lenses 113 may operate in the first image capture mode as defined by the first configuration settings 302. For example, camera processor 114 may cause interface 350 to select binning configurations 304 to configure image sensors 112 for a first binning level (e.g., 2×2 binning, 4×4 binning, no binning, etc.). The first image capture mode may also include one or more image capture operations configured by auto focus configuration settings 306, auto white balance configuration settings 308, auto exposure configuration settings 310, and auto gain configuration settings 312.

In some examples, a user, via user interface 122, may provide a user zoom change 305 identifying a desired level of zoom. For example, user zoom change 305 may identify a field of zoom, such as zoom field 208 of FIG. 2B, or a zoom level, such as 2x or 4x zoom. CPU 116 may parse user zoom change 305, and provide a zoom command 307 to camera processor 114 identifying the desired level of zoom.

In response (e.g., and before enabling the updated level of zoom), camera processor 114 may determine whether the desired level of zoom is above, or below, a predefined binning transition threshold (e.g., which may be stored in system memory 130). Each binning transition threshold may be associated with a zoom range (e.g., range of zoom levels). If the desired level of zoom is not beyond the predefined binning transition threshold, camera processor 114 may configure first configuration settings 302 in accordance with the requested desired level of zoom. For example, camera processor 114 may update zoom configuration settings 314, which may alter a focal length of one or more of lenses 113, or may cause a switch from one of lenses 113 to another of lenses 113.

If the desired level of zoom is beyond the predefined binning transition threshold, camera processor 114 may first configure first configuration settings 302 in accordance with the desired level of zoom without changing the binning level (e.g., without updating binning configuration settings 304). For example, camera processor 114 may update zoom configuration settings 314 and auto exposure configuration settings 310 based on the desired level of zoom. Camera processor 114 may then determine san expiration of a predetermined time period subsequent to the update to the configuration settings 302 (other than binning configuration settings 304). The predetermined time period may be stored, for example in system memory 130. Upon expiration of the predetermined time period, camera processor 114 may configure binning configuration settings 304 based on the desired level of zoom. By delaying the update to binning configuration settings 304, image capture device 100 may reduce defects and/or errors that would otherwise be captured via lens 113 and sensor 112.

For example, one or more of image sensors 112, such as image sensor 112A, may be configured to operate at a first binning level (e.g., 2×2 binning) for a current zoom level based on binning configuration settings 304. The user may request, via user zoom change 305, a decrease to the current zoom level. If the requested decrease is for a zoom level outside of a range of zoom levels associated with the predefined binning transition threshold, camera processor 114 may perform operations that update first configuration settings 302 (other than binning configuration settings 304) based on the desired zoom level (e.g., a zoom field 208 defining the desired zoom level). Camera processor 114 may then periodically (e.g., every frame, every number of frames, every number of milliseconds, etc.) poll a timer to determine when the predetermined time period has passed since the update to first configuration settings 302. Upon expiration of the predetermined time period, camera processor 114 may adjust binning configuration settings 304 to specify a second binning level. In this example, the second binning level may represent a higher level of binning than the first binning level (e.g., 4×4 binning as opposed to 2×2 binning), as the user is requesting a decrease in the zoom level. Camera processor 114 may receive image data 309 from sensors 112 operating under the second binning level.

In some examples, camera processor 114 may configure interface 350 to provide first configuration settings 302 to a first image sensor of image sensors 112 and a first lens of lenses 113, and to provide second configuration settings 322 to a second image sensor of image sensors 112 and a second lens of lenses 113. For example, the first lens may be a wide lens and the second lens may be a telephoto lens. In some examples, the first sensor is configured to bin pixels at a first binning level (e.g., via binning configuration settings 314), and the second sensor is configured to bin pixels at a second binning level (e.g., via binning configuration settings 324).

In some examples, the first lens and first sensor may be configure to capture and transfer image data 309 to camera processor 114, while the second lens and second sensor are deactivated (e.g., via second configuration settings 322 and/or interface 350). As described herein, camera processor 114 may be configured to perform operations that selectively activate or de-active respective combinations of the first lens and image sensor and the second lens and image sensor in accordance with first configuration settings 302 and additionally, or alternatively, second configuration settings 322.

For example, upon receipt of a zoom command 307 identifying a desired change in a zoom level, camera processor 114 may further determine that the desired zoom level change may be effected by activating the second lens and sensor, deactivating the first lens and image sensor, and receiving additional portions of image data 309 from the second image sensor. In some instances, and prior to deactivating the first lens and image sensor, camera processor 114 may perform operations, described herein, that configure one or more image capture operations for the second lens and image sensor based on the desired zoom level change (e.g., a zoom field 208 defining the desired zoom level). For example, camera processor 114 may adjust one or more of auto focus 326, auto white balance 328, auto exposure 330, or auto gain 332 configuration settings stored within the second configuration settings 322.

Upon expiration of a predetermined time period (e.g., ten frames, etc.), which facilitates a pre-convergence of the second lens and image sensor to the adjusted configuration settings, camera processor 114 may activate the second lens and image sensor and receive additional portions of image data 309 from the second image sensor. Camera processor 114 may also perform operations that deactivate the first lens and image sensor.

In some examples, another desired change in the zoom level may be associated with an adjustment to a current binning level of the second sensor. For example, the desired zoom level change may exceed a binning transition threshold of the current binning level of the second sensor (e.g., as currently configured in binning configuration settings 324). As described herein, camera processor 114 may configure one or more image capture operations for the second lens and image sensor based on the desired zoom level change. Upon expiration of the predetermined time period, camera processor 114 may adjust the binning level for the second sensor by updating binning configuration settings 322. Camera processor 114 may further activate, using any of the processes described herein, the second lens and image sensor to capture additional portions of image data 309 in accordance with the adjusted binning level and, in some examples, deactivate the first lens and image sensor.

Figure 4:
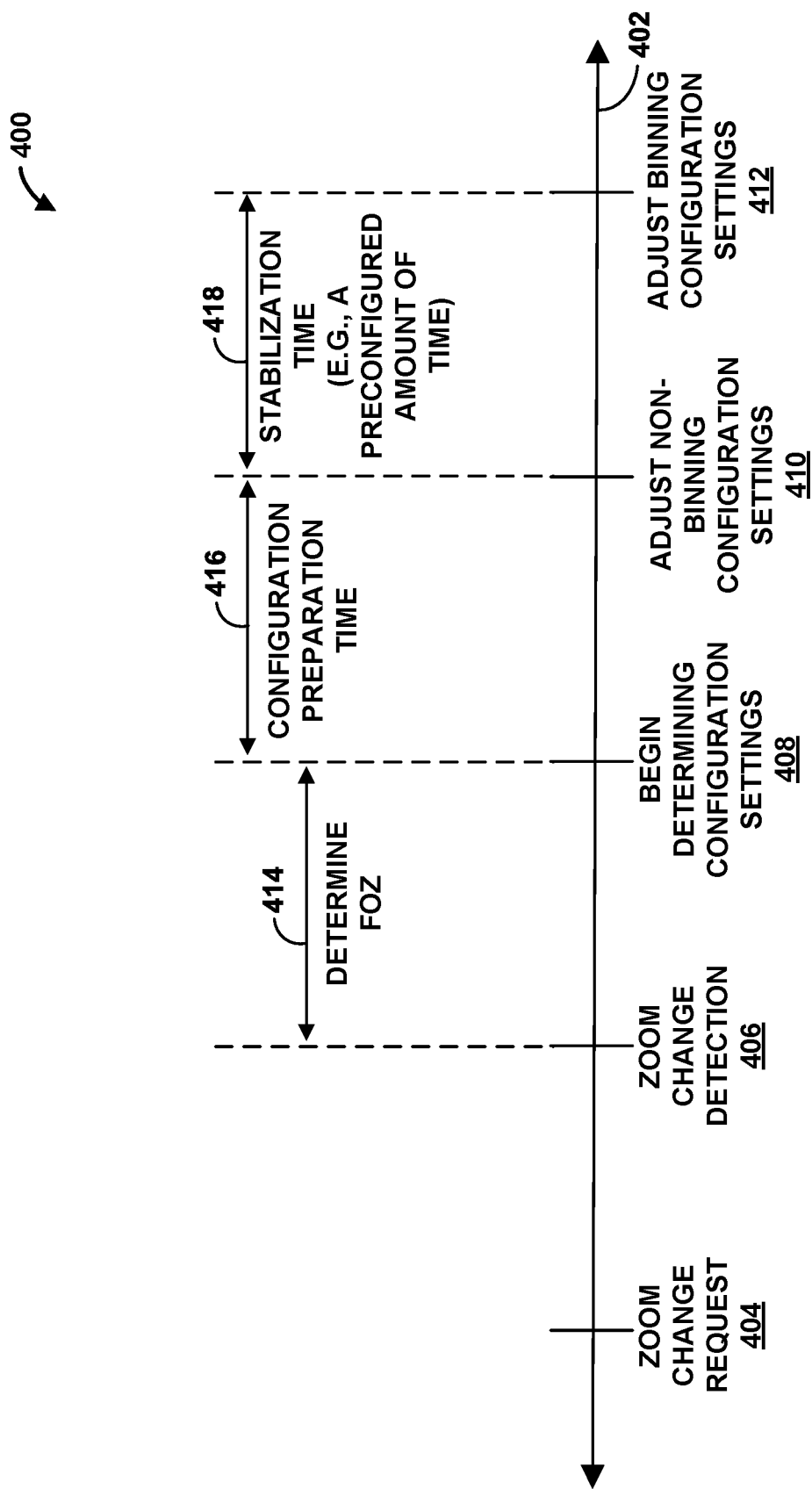
FIG. 4 illustrates a timing diagram during a zoom change by an exemplary image capture device, according to some implementations.

FIG. 4 illustrates an exemplary timing diagram 400 along a timeline 402, where the timing diagram 400 is associated with a zoom adjustment by the image capture device 100. As illustrated in exemplary timing diagram 400, image capture device 100 may receive a zoom change request 404. For example, the zoom change request 404 may be received in response to a user providing input to user interface 122. Thereafter, the zoom change request is detected during zoom change detection 406. The zoom change request may be detected, for example, by CPU 116 polling user interface 122 to determine if a user zoom change 305 has been received. Once detected, image capture device 100 (e.g., via camera processor 114) may determine a FOZ 414 based on the detected zoom change. For example, image capture device 100 may determine a zoom field associated with the detected zoom change (e.g., zoom field 208 of FIG. 2B), and as illustrated in FIG. 4, may determine the FOZ during a period of time between zoom change detection 406 and a determination of configuration settings associated with camera 115.

Once the FOZ has been determined, image capture device 100 may initiation a determination 408 of the configuration settings. For example, image capture device 100 may determine any required adjustments to the configuration settings for one or more image capture operations, such as binning, auto focus, auto white balance, auto exposure, and auto gain (e.g., first configuration settings 302 and/or second configuration settings 322 of FIG. 3). In some examples, and as described herein, image capture device 100 may identify a required update to the binning configuration settings of image sensors 112 (e.g., binning configuration settings 304 and/or binning configuration settings 324) require updating based on a determination that the detected zoom change exceeds a binning transition threshold. The time allocated or required to determine the configuration setting adjustments is indicated in timing diagram 400 as configuration preparation time 416.

Once the configuration setting adjustments have been determined, image capture device 100 adjusts non-binning configuration settings 410. For example, image capture device 100 may update one or more of AF configuration settings 306, 326, AWB configuration settings 308, 328, AE configuration settings 310, 330, and AG configuration settings 312, 332 based on the detected zoom change. Image capture device 100 updates the binning configuration settings after at least a stabilization time 418 has passed since the non-binning configuration settings were adjusted. The stabilization time 418 allows, for example, one or more image capture operations, such as AE, to stabilize before transitioning from a first binning level to a second binning level. The stabilization time 418 may be a predetermined amount of time (e.g., a preconfigured amount of time).

Once the stabilization time 418 has passed (since adjusting non-binning configuration settings 410), image capture device adjusts the binning configuration settings 412 to transition the sensor 112 from the first binning level to the second binning level. For example, image capture device 100 may update binning configuration settings 304 for sensors 112 after the stabilization time 418 has passed. Image capture device 100 may then begin capturing image data from the sensors 112 configured to operate at the second binning level.

Figure 5:
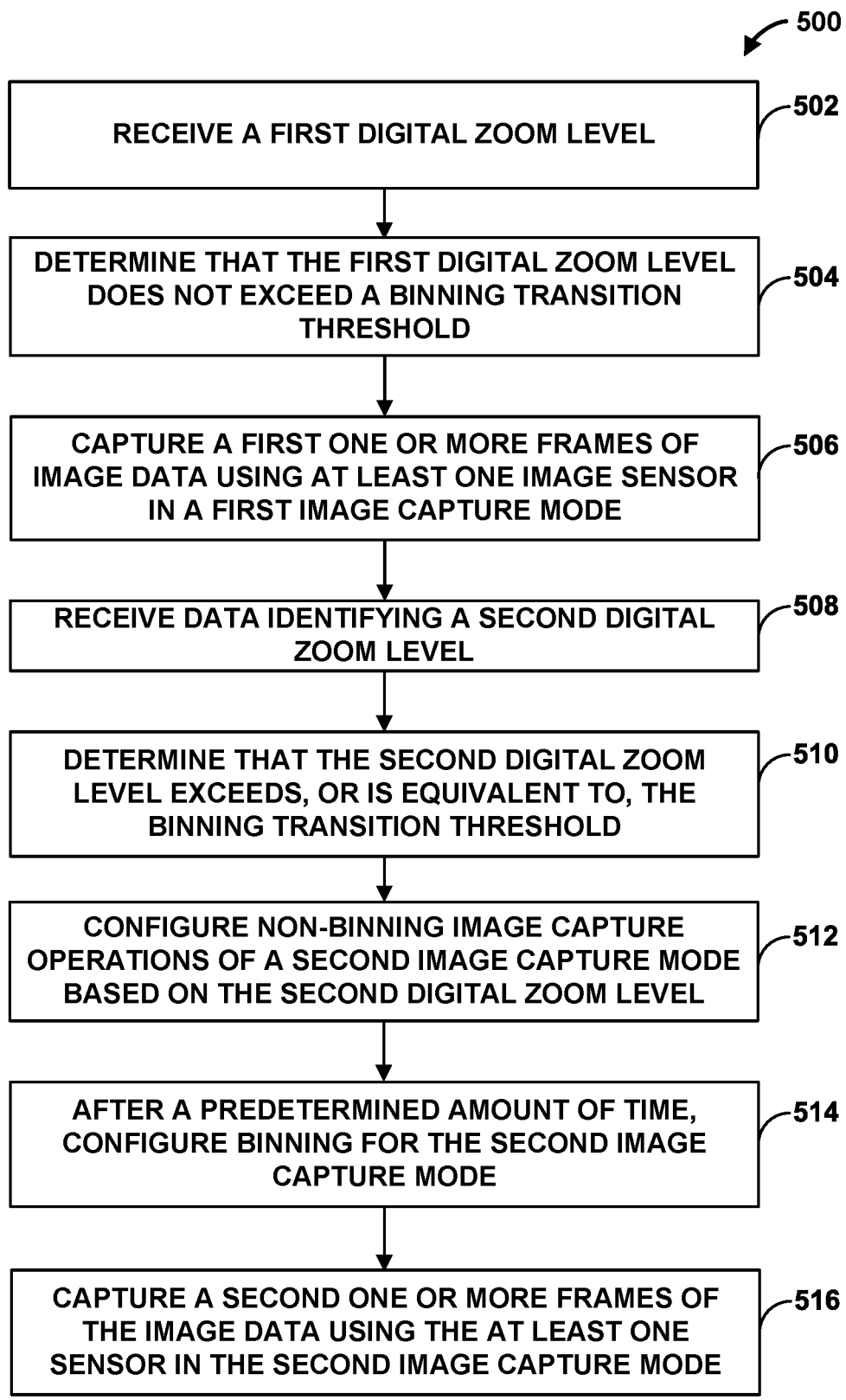
FIG. 5 is a flowchart of an exemplary process for capturing image data while transitioning between binning levels, according to some implementations.

FIG. 5 is a flowchart of an example process 500 for capturing image data while transitioning from a first binning level to a second binning level, in accordance with one implementation. Process 500 may be performed by one or more processors executing instructions locally at an image capture device, such as camera processor 114 of image capture device 100 of FIG. 1. Accordingly, the various operations of process 500 may be represented by executable instructions held in storage media of one or more computing platforms, such as instruction memory 132 of image capture device 100.

Referring to block 502, image capture device 100 may receive data identifying a first digital zoom level. For example, a user may provide input to user interface 122 to identify a requested level of digital zoom. CPU 116 may receive input data from user interface 122, and parse the input data to determine the requested level of digital zoom (e.g., zoom field 208 of FIG. 2B), and provide a zoom command to camera processor 114.

At block 504, the image capture device 100 determines that the digital zoom level does not exceed a binning transition threshold. For example, camera processor 114 may obtain, from system memory 130, a binning transition threshold associated with a current binning level of one or more of image sensors 112. The binning transition threshold may identify a maximum corresponding zoom level (e.g., 2x zoom), and camera processor 114 may compare the first digital zoom level to the maximum corresponding zoom level, and determine that the first digital zoom level is less than the maximum corresponding zoom level. In some examples, the binning transition threshold identifies a range of corresponding zoom levels, including a minimum zoom level and a maximum zoom level (e.g., no zoom to 2x zoom). Camera processor 114 may determine that the first digital zoom level is less than the maximum zoom level and greater than the minimum zoom level.

Proceeding to block 506, image capture device 100 captures one or more frames of image data using one or more image sensor, such as image sensor 112, in a first image capture mode. The first image capture mode includes a current binning configuration of the at least one sensor. The first image capture mode may be indicative of a current configuration of one or more image capture operations, such as auto focus, auto white balance, auto exposure, and auto gain. For example, the first image capture mode may be defined, at least in part, by first configuration settings 302 of FIG. 3.

At block 508, the image capture device 100 receives a data identifying a second digital zoom level. The second digital zoom level may be different than the first digital zoom level, and at block 510, the image capture device 100 may determine determines that the second digital zoom is equivalent to, or exceeds, the binning transition threshold. For example, camera processor 114 may compare the second digital zoom level to the maximum corresponding zoom level corresponding to the binning transition threshold, and determine that the second digital zoom level is the equivalent to, or exceeds, the maximum corresponding zoom level.

At block 512, the image capture device 100 may configure one or more non-binning image capture operations of a second image capture mode based on the second digital zoom level. For example, based on determining that the second digital zoom level is equivalent to, or exceeds the maximum corresponding zoom level, camera processor 114 may perform operations that adjust one or more of the non-binning configuration settings of first configuration settings 302 (e.g., auto focus 306, auto white balance 308, auto exposure 310, and auto gain 312) based on the second digital zoom level.

In some examples, at block 512 the image capture device 100 captures one or more frames of image data using the one or more image sensors, such as image sensor 112, based on the current binning configuration of the at least one sensor (e.g., the binning configuration of the one or more image sensors corresponding to the first image capture mode). Image capture device 100 may apply one or more of the non-binning image capture operations of the second image capture mode to the received frames of image data.

At block 514, upon expiration of a predetermined time period (subsequent to the configuration of the non-binning image capture operations at block 512), image capture device 100 may configure the binning configuration setting for the second image capture mode based on the second digital zoom level. For example, when the second digital zoom level is equivalent to or exceeds the maximum corresponding zoom level (e.g., the user is requesting more zoom), camera processor 114 may reduce a current level of billing associated with image sensors 112, and may update binning configuration settings 304 to reflect the reduced level of binning upon expiration of the predetermined time period, e.g., to effectuate the binning adjustment.

At block 516, image capture device 100 may capture one or more frames of image data using one or more of image sensors 112 operating in the second image capture mode. For example, image sensor 112A may capture image data and bin the image data in accordance with the updated binning configuration settings 304.

Figure 6:
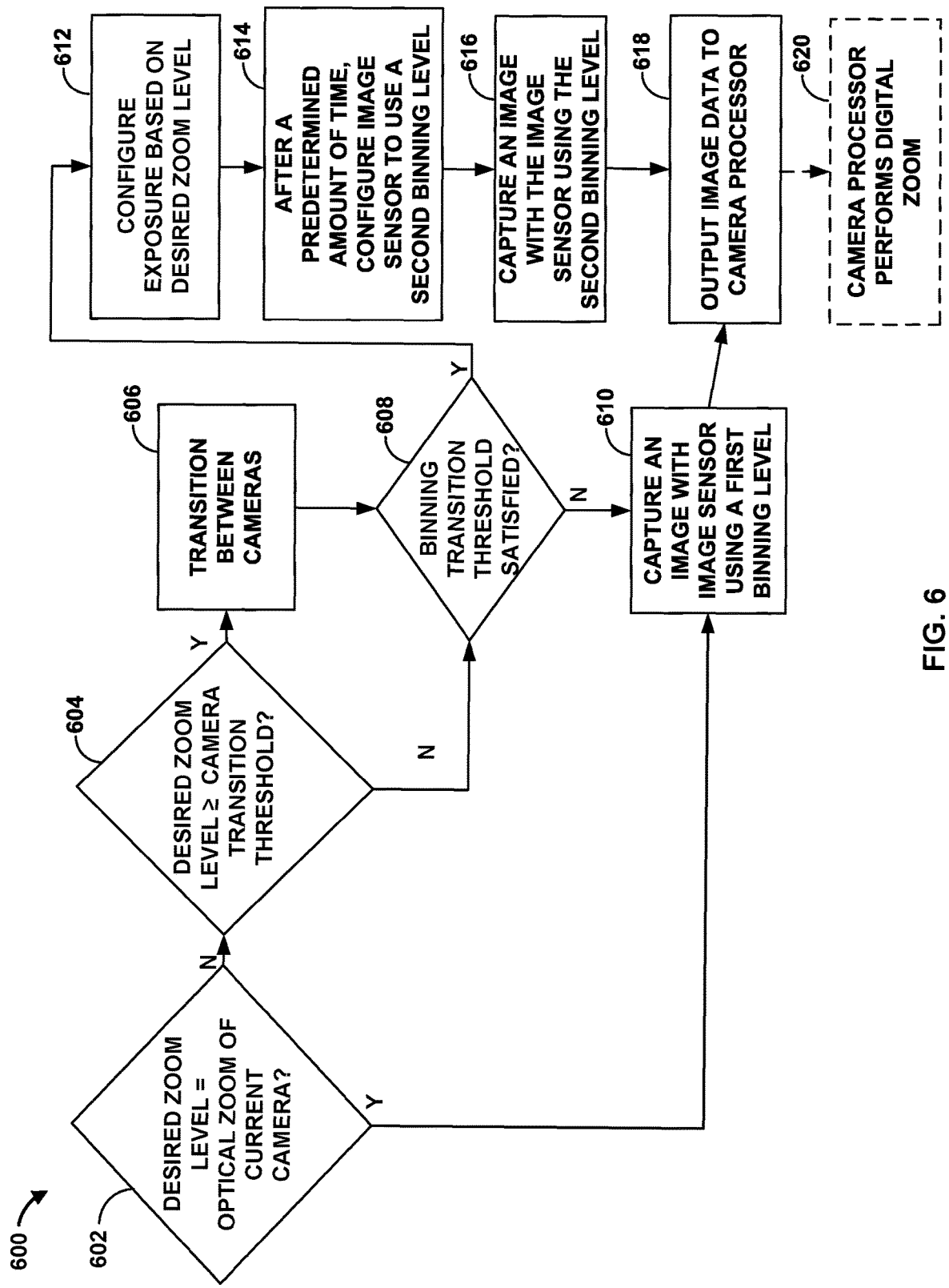
FIG. 6 is a flowchart of an exemplary process for performing zoom operations using various binning levels, according to some implementations.

FIG. 6 is a flowchart of an example process 600 for performing zoom operations using various binning levels, in accordance with one implementation. Process 600 may be performed by one or more processors executing instructions locally at an image capture device, such as camera processor 114 of image capture device 100 of FIG. 1. Accordingly, the various operations of process 600 may be represented by executable instructions held in storage media of one or more computing platforms, such as instruction memory 132 of image capture device 100.

At block 602, camera processor 114 may determine whether a desired zoom level exceeds an optical zoom level of a current camera, such as camera 115 of FIG. 1. For example, the camera 115 may include a lens, such as lens 113A, characterized by a 1.0× optical zoom level.

Camera processor 114 may determine that the desired zoom level is equal to or approximately equal (e.g., within a range of 90% to 100%) to the optical zoom of the current lens 113 (e.g., block 602; YES). For example, the desired zoom level may be 1.0× where the current lens has a 1.0× optical zoom level. In such instances, at block 610 camera processor 114 may perform operations, described herein, that cause image sensors 112 to capture image data in accordance with a first binning level, at block 610. Image sensor 112 may output the binned image data to camera processor 114 at block 618. Because the desired zoom level, in this example, is equal to or was approximately equal to the optical zoom of current lens 113, camera processor 114 may forego performing any digital zoom operations.

Alternatively, if the desired zoom level were not equal to or approximately equal to the optical zoom of camera 115 (e.g., block 602; NO), camera processor 114 may, at block 604, whether the desired zoom level exceeds, or is equivalent to, a camera transition threshold. The camera transition threshold may be related to the particular configuration of lenses 113, such that each of lenses 113 may be used at various zoom levels. For example, camera processor 114 may compare the desired zoom level (e.g., a 1× zoom) to the camera transition threshold (e.g., a 3× zoom) to determine whether image capture device should transition from a camera 115 to a second camera of image capture device 110. For example, if the zoom level does not exceed the camera transition threshold (e.g., block 604; NO), camera processor 114 may continue to use the current camera, e.g., camera 115, and example process 600 proceeds to block 608.

If the desired zoom level exceeds, or is equivalent to, the camera transition threshold (e.g., block 604; NO), camera processor 114 may perform operations that transition between camera 115 and the second camera at block 606, and exemplary process 600 proceeds to block 608. At block 608, camera processor 114 may determine whether the desired zoom level exceeds, or is equivalent to, a binning transition threshold. If the desired zoom level does not exceed the binning transition threshold, camera processor 114 may perform operations that cause one or more of image sensors 112 to bin pixels in accordance with a first binning level. In some examples, the first binning level may specify that one or more of image sensors 112 combine two or more pixels to generate corresponding output pixels of the image data. In other examples, the first binning level may be associated with or specify a non-binning mode of operation for one or more of image sensors 112, as described herein.

If, however, the desired zoom level is equivalent to, or exceeds the binning transition threshold (e.g., step 608; YES), at block 612 camera processor 114 may configure one or more image capture operations, such as auto exposure, based on the desired zoom level. Camera processor 114 may then adjust auto exposure configuration settings 310 for image sensors 112 to reflect the configure image capture operations.

At block 612, in some examples, camera processor 114 may receive image data captured by image sensors 112 in accordance with the first binning level. Image capture device 100 may apply one or more of the configured image capture operations, such as configured auto exposure, to the received image data.

At block 614, camera processor 114 performs operations that causes one or more of image sensors 112 to transition to a second binning level upon expiration of a predetermined time period, such as the stabilization time 418 of FIG. 4. The predetermined time period may be stored in system memory 130, and image capture device 100 may establish the predetermined time p[period in accordance with an amount of time (e.g., determined empirically) that it takes image data to stabilize after adjusting the image capture operation settings. In some examples, the second binning level may be one that combines fewer pixels of image sensors 112 relative to the first binning level for each output pixel of the image data.

At block 616, camera processor 114 may cause one or more of image sensors 112 to capture image data in accordance with the second binning level. At block 618, image sensors 112 may output the image pixels (binned according to the second binning level) for the captured image data to camera processor 114.

In some examples, at block 620, camera processor 114 may perform a digital zoom operation including cropping, upsampling, scaling, and/or combinations thereof, to achieve the desired zoom level. Camera processor 114 may perform the digital zoom operation on the pixels received from image sensors 112.

Figure 7:
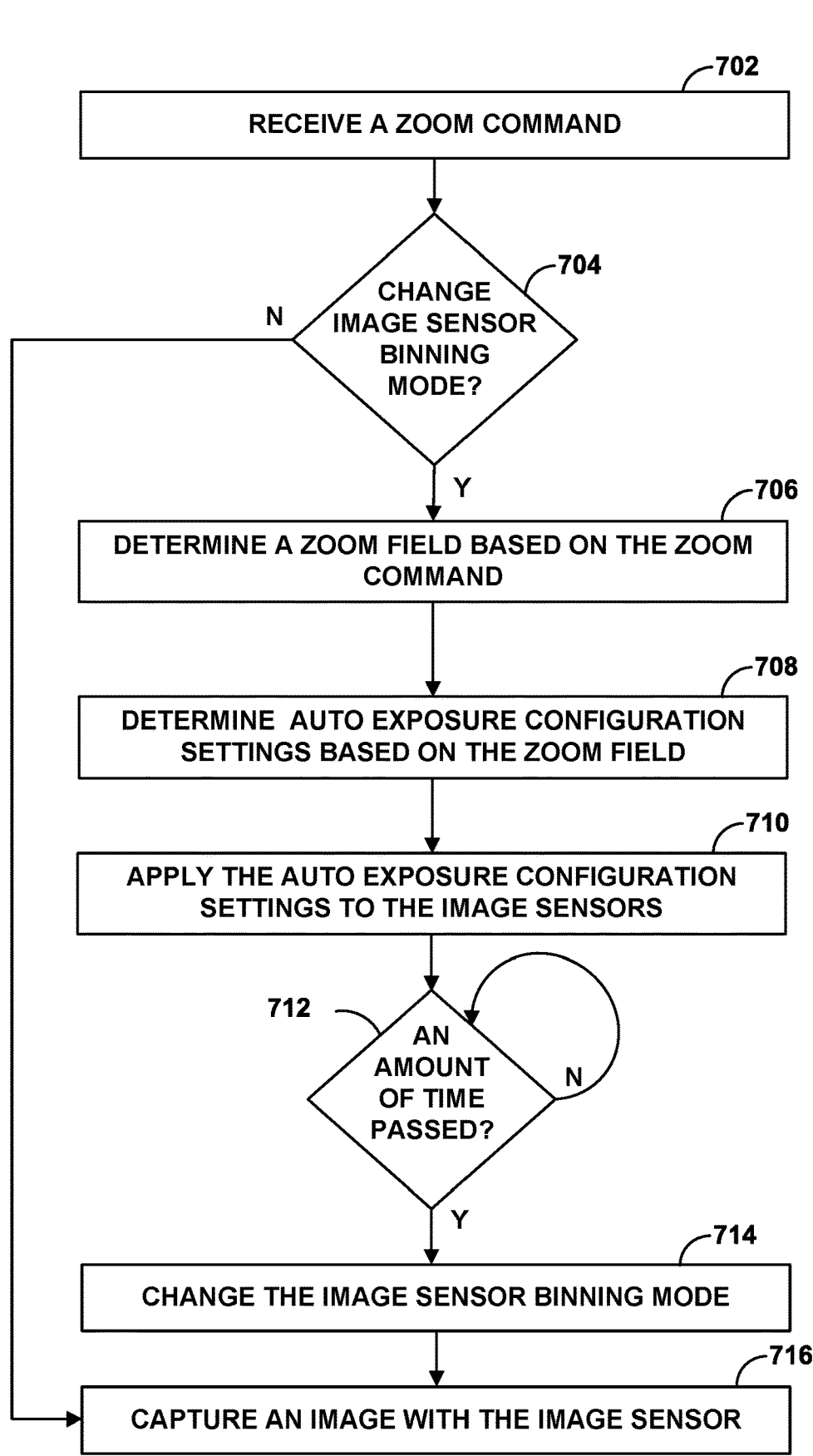
FIG. 7 is a flowchart of an exemplary process for configuring an image sensor in response to a zoom change, according to some implementations.

FIG. 7 is a flowchart of an example process 700 for performing zoom operations using various binning levels, in accordance with one implementation. Process 700 may be performed by one or more processors executing instructions locally at an image capture device, such as camera processor 114 of image capture device 100 of FIG. 1. Accordingly, the various operations of process 700 may be represented by executable instructions held in storage media of one or more computing platforms, such as instruction memory 132 of image capture device 100.

At block 702, image capture device 100 receives a zoom command that identifies a desired zoom level. For example, image capture device 100 may receive a user zoom change 305 from a user providing input to user interface 122.

At block 704, image capture device 100 may determines whether to modify an image sensor binning mode based on the received zoom command. For example, image capture device 100 may be configured to receive image data image output by image sensors 112 in accordance with a first binning level. In some instances, at block 704, may determine whether to modify the image sensor binning mode and as such, whether image sensors 112 should be transitioned from the first binning level to a second binning level, based on a comparison of the desired zoom level (identified by the zoom command) and a zoom level associated with a predefined binning transition threshold.

If the desired zoom level corresponds, or is equivalent to, with the zoom level associated with the predefined binning transition threshold, image capture device 100 may decline to modify the image sensor binning mode in response to the received zoom command (e.g., block 704; NO), and exemplary process 700 proceeds to block 716. In other instances, if the desired zoom level does not correspond to, or is not equivalent to the zoom level associated with the predefined binning transition threshold, image capture device 100 may elect to modify the image sensor binning mode in response to the received zoom command (e.g., block 704; YES), and exemplary process 700 proceeds to block 706.

In some examples, the predefined binning transition threshold is associated with a range of zoom levels, and at block 704, image capture device 100 may determine whether the desired zoom level falls within the range of zoom levels. If the desired zoom level falls within the range of zoom levels (e.g., inclusively), image capture device 100 may decline to modify the image sensor binning mode in response to the received zoom command (e.g., block 704; NO), and exemplary process 700 proceeds to block 716. Otherwise, if the desired zoom level falls outside the range of zoom levels, image capture device 100 may elect to modify the image sensor binning mode in response to the received zoom command (e.g., block 704; YES), and exemplary process 700 proceeds to block 706 where an image may be captured with the sensor operating using the current binning level (e.g., first binning level).

At block 706, image capture device 100 determines a zoom field based on the zoom command received at block 702. The zoom filed identifies at least a portion of a scene, such as scene 202 of FIG. 2A, that a user would like to zoom in or out of. At block 708, image capture device 100 may determine configuration settings for auto exposure operations based on the zoom field. For example, image capture device 100 may determine values for auto exposure configuration settings 306 that control or adjust automatic exposure operations for image sensor 112, as specified within first configuration settings 302 of FIG. 3.

Proceeding to block 710, the image capture device 100 applies the auto exposure configuration settings to one or more of image sensors 112. For example, image capture device 100 may perform operations that write the values determined at block 708 to the auto exposure configuration settings 306, as maintained within memory portion 301A of FIG. 3. At block 712, the image capture device 100 determines whether a predetermined amount of time has passed since the application of the auto exposure configuration settings at block 710. The predetermined amount of amount of time may be stored in non-volatile memory, such as system memory 130, and may be determined based on an amount of time that it takes captured image data to stabilize after an adjustment of the image capture operation settings (e.g., stabilization time 418).

As an example, image capture device 100 may poll a timer to determine when the predetermined time period has passed since the update to auto exposure configuration settings 306. Upon expiration of the predetermined time period, exemplary process 700 may proceeds to block 714.

During block 712, in some examples, image capture device 100 may receive image data captured by image sensors 112 in accordance with the current binning level (e.g., first binning level). Image capture device 100 may apply one or more image capture operations to the received image data based on the updated auto exposure configuration settings 306.

At block 714, image capture device 100 may perform operations that modify the image sensor binning mode. For example, image capture device 100 may adjust auto exposure configuration settings 310, as maintained within portion 301A of FIG. 3, to configure image sensors 112 to operate in accordance with the second binning level. Exemplary process 700 may then proceed to block 716, and image capture device 100 may receive image data captured by image sensors 112 operating under the modified image sensor binning mode (e.g., the second binning level).

A person of skill in the art would understand that image captures may include a single frame (e.g., snapshot) capture or a video stream capture. For example, one or more cameras of image capture device 100, such as camera 115, or one or more camera processors of these cameras, such as camera processor 114, may perform the exemplary operations shown in FIGS. 5-7.

Although the methods described above are with reference to the illustrated flowcharts, many other ways of performing the acts associated with the methods may be used. For example, the order of some operations may be changed, and some embodiments may omit one or more of the operations described and/or include additional operations.

In addition, the methods and system described herein may be at least partially embodied in the form of computer-implemented processes and apparatus for practicing those processes. The disclosed methods may also be at least partially embodied in the form of tangible, non-transitory machine readable storage media encoded with computer program code. For example, the methods may be embodied in hardware, in executable instructions executed by a processor (e.g., software), or a combination of the two. The media may include, for example, RAMS, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

The subject matter has been described in terms of exemplary embodiments. Because they are only examples, the claimed inventions are not limited to these embodiments. Changes and modifications may be made without departing the spirit of the claimed subject matter. It is intended that the claims cover such changes and modifications.

We claim:

1. A method for operating an image capture device, comprising:
   receiving first image data captured by a first image sensor in accordance with a first binning level, and applying an image capture operation to the first image data using a setting that is based on the first binning level;
   receiving input data comprising a first zoom level;
   determining a second binning level for the first image sensor based on the first zoom level;

adjusting the setting of the first image capture operation based on the second binning level;
receiving second image data captured by the first image sensor in accordance with the first binning level, and applying the image capture operation to the second image data using the adjusted setting; and
adjusting the first binning level to the second binning level subsequent to the capturing of the second image data.

2. The method of claim 1, wherein the first image sensor comprises a plurality of pixels, the first image data comprises a first plurality of output values, and the second image data comprises a second plurality of output values.

3. The method of claim 2, wherein:
in accordance with the first binning level, the first image sensor generates each of the first plurality of output values based on a combination of a first number of the plurality of pixels; and
in accordance with the second binning level, the first image sensor generates each of the second plurality of output values based on a combination of a second number of the plurality of pixels, wherein the first number exceeds the second number.

4. The method of claim 3, wherein each of the second plurality of output values corresponds to a pixel value of a corresponding one of the plurality of pixels.

5. The method of claim 1, wherein adjusting the setting of the first image capture operation comprises adjusting the setting of at least one of auto focus, auto white balance, auto exposure, or auto gain operation.

6. The method of claim 1, wherein:
the setting comprises a configuration setting of the first image capture operation; and
adjusting the setting of the first image capture operation comprises storing the adjusted configuration setting within a non-volatile memory.

7. The method of claim 1 comprising:
receiving third image data captured by the first image sensor in accordance with the second binning level;
receiving additional input data comprising a second zoom level; and
determining that the second zoom level is below a threshold.

8. The method of claim 1 comprising:
receiving additional input data comprising a second zoom level;
determining a third binning level for the first image sensor based on the second zoom level;
adjusting the setting of the first image capture operation based on the third binning level;
receiving third image data captured by the first image sensor in accordance with the second binning level; and
adjusting the second binning level to the third binning level subsequent to the capturing of the second image data.

9. The method of claim 8 comprising receiving fourth image data captured by the first image sensor in accordance with the third binning level.

10. The method of claim 1 comprising:
receiving third image data captured by the first image sensor in accordance with the second binning level; and
applying at least one of digital cropping, downsampling, upsampling, or scaling to the third image data to achieve the first zoom level.

11. An image capture device comprising:
a non-transitory, machine-readable storage medium storing instructions; and
at least one processor coupled to the non-transitory, machine-readable storage medium, the at least one processor being configured to execute the instructions to:
receive first image data captured by a first image sensor in accordance with a first binning level, and apply an image capture operation to the first image data using a setting that is based on the first binning level;
receive input data comprising a first zoom level;
determine a second binning level for the first image sensor based on the first zoom level;
adjust the setting of the first image capture operation based on the second binning level;
receive second image data captured by the first image sensor in accordance with the first binning level, and apply the image capture operation to the second image data using the adjusted setting; and
adjust the first binning level to the second binning level subsequent to the capturing of the second image data.

12. The image capture device of claim 11 wherein the first image sensor comprises a plurality of pixels, the first image data comprises a first plurality of output values, and the second image data comprises a second plurality of output values.

13. The image capture device of claim 12 wherein:
in accordance with the first binning level, the first image sensor generates each of the first plurality of output values based on a combination of a first number of the plurality of pixels; and
in accordance with the second binning level, the first image sensor generates each of the second plurality of output values based on a combination of a second number of the plurality of pixels, wherein the first number exceeds the second number.

14. The image capture device of claim 13 wherein each of the second plurality of output values corresponds to a pixel value of a corresponding one of the plurality of pixels.

15. The image capture device of claim 11 wherein adjusting the first image capture operation comprises adjusting at least one of auto focus, auto white balance, auto exposure, and auto gain.

16. The image capture device of claim 11 wherein:
the setting comprises a configuration setting of the first image capture operation; and
adjusting the setting of the first image capture operation comprises storing the adjusted configuration setting within a non-volatile memory.

17. The image capture device of claim 11 wherein the at least one processor is further configured to execute the instructions to:
receive third image data captured by the first image sensor in accordance with the second binning level;
receive additional input data comprising a second zoom level; and
determine that the second zoom level is below a threshold.

18. The image capture device of claim 11 wherein the at least one processor is further configured to execute the instructions to:
receive additional input data comprising a second zoom level;
determine a third binning level for the first image sensor based on the second zoom level;
adjust the setting of the first image capture operation based on the third binning level;
receive third image data captured by the first image sensor in accordance with the second binning level; and adjust the second binning level to the third binning level subsequent to the capturing of the second image data.

19. The image capture device of claim 18 wherein the at least one processor is further configured to execute the instructions to receive fourth image data captured by the first image sensor in accordance with the third binning level.

20. The image capture device of claim 11 wherein the at least one processor is further configured to execute the instructions to:
receive third image data captured by the first image sensor in accordance with the second binning level; and
apply at least one of digital cropping, downsampling, upsampling, or scaling to the third image data to achieve the first zoom level.

21. A non-transitory, machine-readable storage medium storing instructions that, when executed by at least one processor, cause the at least one processor to perform operations comprising:
receiving first image data captured by a first image sensor in accordance with a first binning level, and applying an image capture operation to the first image data using a setting that is based on the first binning level;
receiving input data comprising a first zoom level;
determining a second binning level for the first image sensor based on the first zoom level;
adjusting the setting of the first image capture operation based on the second binning level;
receiving second image data captured by the first image sensor in accordance with the first binning level, and applying the image capture operation to the second image data using the adjusted setting; and
adjusting the first binning level to the second binning level subsequent to the capturing of the second image data.

22. The non-transitory, machine-readable storage medium of claim 21 wherein the first image sensor comprises a plurality of pixels, the first image data comprises a first plurality of output values, and the second image data comprises a second plurality of output values.

23. The non-transitory, machine-readable storage medium of claim 22 wherein:
in accordance with the first binning level, the first image sensor generates each of the first plurality of output values based on a combination of a first number of the plurality of pixels; and
in accordance with the second binning level, the first image sensor generates each of the second plurality of output values based on a combination of a second number of the plurality of pixels, wherein the first number exceeds the second number.

24. The non-transitory, machine-readable storage medium of claim 23 wherein each of the second plurality of output values corresponds to a pixel value of a corresponding one of the plurality of pixels.

25. The non-transitory, machine-readable storage medium of claim 21 wherein adjusting the setting of the first image capture operation comprises adjusting the setting of at least one of auto focus, auto white balance, auto exposure, or auto gain operation.

26. The non-transitory, machine-readable storage medium of claim 21 wherein:
the setting comprises a configuration setting of the first image capture operation; and
adjusting the setting of the first image capture operation comprises storing the adjusted configuration setting within a non-volatile memory.

27. The non-transitory, machine-readable storage medium of claim 21 wherein the instructions, when executed by the at least one processor, cause the at least one processor to perform further operations comprising:
receiving third image data captured by the first image sensor in accordance with the second binning level;
receiving additional input data comprising a second zoom level; and
determining that the second zoom level is below a threshold.

28. The non-transitory, machine-readable storage medium of claim 21 wherein the instructions, when executed by the at least one processor, cause the at least one processor to perform further operations comprising:
receiving additional input data comprising a second zoom level;
determining a third binning level for the first image sensor based on the second zoom level;
adjusting the setting of the first image capture operation based on the third binning level;
receiving third image data captured by the first image sensor in accordance with the second binning level; and
adjusting the second binning level to the third binning level subsequent to the capturing of the second image data.

29. The non-transitory, machine-readable storage medium of claim 28 wherein the instructions, when executed by the at least one processor, cause the at least one processor to perform further operations comprising receiving fourth image data captured by the first image sensor in accordance with the third binning level.

30. The non-transitory, machine-readable storage medium of claim 21 wherein the instructions, when executed by the at least one processor, cause the at least one processor to perform further operations comprising:
receiving third image data captured by the first image sensor in accordance with the second binning level; and
applying at least one of digital cropping, downsampling, upsampling, or scaling to the third image data to achieve the first zoom level.

* * * * *